US011260582B2

(12) United States Patent
TenHouten et al.

(10) Patent No.: US 11,260,582 B2
(45) Date of Patent: Mar. 1, 2022

(54) METHODS AND APPARATUS FOR MANUFACTURING OPTIMIZED PANELS AND OTHER COMPOSITE STRUCTURES

(71) Applicant: DIVERGENT TECHNOLOGIES, INC., Los Angeles, CA (US)

(72) Inventors: Broc William TenHouten, Rancho Palos Verdes, CA (US); Thomas Samuel Bowden, Jr., Los Angeles, CA (US); Jon Paul Gunner, Palos Verdes Estates, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 328 days.

(21) Appl. No.: 16/162,301

(22) Filed: Oct. 16, 2018

(65) Prior Publication Data
US 2020/0114573 A1    Apr. 16, 2020

(51) Int. Cl.
*B32B 3/12*       (2006.01)
*B29C 64/153*    (2017.01)
(Continued)

(52) U.S. Cl.
CPC .......... *B29C 64/153* (2017.08); *B29C 64/209* (2017.08); *B29C 64/393* (2017.08);
(Continued)

(58) Field of Classification Search
None
See application file for complete search history.

(56) References Cited

U.S. PATENT DOCUMENTS

| 5,203,226 A | 4/1993 | Hongou et al. |
| 5,742,385 A | 4/1998 | Champa |
| (Continued) | | |

FOREIGN PATENT DOCUMENTS

| EP | 3034208 B1 | 2/2018 |
| WO | 1996036455 A1 | 11/1996 |
| (Continued) | | |

OTHER PUBLICATIONS

US 9,202,136 B2, 12/2015, Schmidt et al. (withdrawn)
(Continued)

*Primary Examiner* — Mary I Omori
(74) *Attorney, Agent, or Firm* — Arent Fox LLP

(57) ABSTRACT

The disclosure relates to additively manufactured (AM) composite structures such as panels for use in transport structures or other mechanized assemblies. An AM core may be optimized for an intended application of a panel. In various embodiments, one or more values such as strength, stiffness, density, energy absorption, ductility, etc. may be optimized in a single AM core to vary across the AM core in one or more directions for supporting expected load conditions. In an embodiment, the expected load conditions may include forces applied to the AM core or corresponding panel from different directions in up to three dimensions. Where the structure is a panel, face sheets may be affixed to respective sides of the core. The AM core may be a custom honeycomb structure. In other embodiments, the face sheets may have custom 3-D profiles formed traditionally or through additive manufacturing to enable structural panels with complex profiles. The AM core may include a protrusion to provide fixturing features to enable external connections. In other embodiments, inserts, fasteners, or internal channels may be co-printed with the core. In still other embodiments, the AM core may be used in a composite
(Continued)

structure such as, for example a rotor blade or a vehicle component.

41 Claims, 28 Drawing Sheets

(51) Int. Cl.
*B29C 64/393* (2017.01)
*B29C 64/209* (2017.01)
*B33Y 80/00* (2015.01)
*B32B 27/12* (2006.01)
*B32B 37/14* (2006.01)
*B33Y 10/00* (2015.01)
*B33Y 50/02* (2015.01)
*B32B 3/26* (2006.01)

(52) U.S. Cl.
CPC ............... *B32B 3/12* (2013.01); *B32B 3/263* (2013.01); *B32B 27/12* (2013.01); *B32B 37/146* (2013.01); *B32B 2262/106* (2013.01); *B32B 2305/024* (2013.01); *B32B 2309/70* (2013.01); *B32B 2310/0843* (2013.01); *B32B 2603/00* (2013.01); *B32B 2605/00* (2013.01); *B33Y 10/00* (2014.12); *B33Y 50/02* (2014.12); *B33Y 80/00* (2014.12)

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,222,229 B1 | 12/2015 | Chang et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |

(56) References Cited

U.S. PATENT DOCUMENTS

| | | |
|---|---|---|
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |

(56) References Cited

U.S. PATENT DOCUMENTS

| | | |
|---|---|---|
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2011/0223372 A1* | 9/2011 | Metz .................. B32B 5/02 428/80 |
| 2014/0093678 A1 | 4/2014 | Walker |
| 2014/0277669 A1 | 9/2014 | Nardi et al. |
| 2015/0298423 A1 | 10/2015 | Holemans |
| 2015/0344142 A1 | 12/2015 | Roach et al. |
| 2016/0039225 A1 | 2/2016 | Smith |
| 2016/0153658 A1 | 6/2016 | Xu |
| 2017/0050677 A1* | 2/2017 | Czinger ............. B62D 29/046 |
| 2017/0113344 A1 | 4/2017 | Schönberg |
| 2017/0182741 A1* | 6/2017 | Ayithi ................ C08J 5/044 |
| 2017/0341309 A1 | 11/2017 | Piepenbrock et al. |
| 2017/0355138 A1 | 12/2017 | Mark |
| 2018/0058016 A1 | 3/2018 | Penland, Jr. et al. |
| 2018/0169993 A1 | 6/2018 | Carstensen et al. |
| 2019/0337220 A1* | 11/2019 | Beyerle ............... B33Y 10/00 |
| 2019/0351642 A1* | 11/2019 | Zafar ................. B29C 64/118 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Alain Toufine, machine translation of EP 3034208 Description, Jun. 22, 2016 (Year: 2016).*
First Notification for Making Rectifications received in Chinese Patent Application No. 201921737302.1 dated Jun. 2, 2020.
International Search Report & Written Opinion received in PCT/US2019/056475 dated Jan. 10, 2020.

* cited by examiner

METHODS AND APPARATUS FOR MANUFACTURING OPTIMIZED PANELS AND OTHER COMPOSITE STRUCTURES

BACKGROUND

Field

The present disclosure relates to panels and other components used in transport structures such as automobiles, trucks, trains, boats, aircraft, motorcycles, and the like.

Background

Structural panels are commonly made by fabricating a honeycomb core using dedicated tooling and then adhering two outer structural skins, also known as face sheets, on respective sides of the core. Honeycomb structures are used in numerous applications, including as the core, or interior portion, of panels and other composite structures used in transport structures. Attributes of a honeycomb-based core may include minimal density and relatively high out-of-plane compression and shear properties. In some configurations, alternative lattice-based structures can be used as the core or a portion thereof and may provide similar benefits.

Typical honeycomb and lattice manufacturing processes are unfortunately labor and tooling intensive, and can therefore be time-consuming and expensive. The resulting honeycomb panels also may include anisotropic properties, which can be highly undesirable in many applications involving transport structures. For example, traditional core materials used for providing support in the panel interior are generally only stiff in one direction, such as in a compressional direction orthogonal to the panel. However, expected loads may include anticipated forces applied in other directions that the panel, with the anisotropic properties of its core, cannot support. Stiffness is but one example of many properties in a panel core whose values may be necessary for proper panel operation given a global set of expected loads. Numerous other material properties (e.g., strength, flexibility, rigidity, etc.) include similar directional or orientation-related limitations in various forms and therefore present essentially the same dilemma.

Manufacturers have attempted to address these shortcomings by producing a composite core having a variety of distinct layers, sections, or regions, each layer, section or region designed to target one aspect of the expected loads by providing desirable values of characteristics (e.g., density, stiffness, impact strength, tensile strength, rigidity, flexibility, energy absorption, and the like) in a specific direction to accommodate that aspect of the load. Problems inherent in this approach include higher manufacturing costs in using different materials, additional development time in designing each such material for an intended purpose, and potentially longer manufacturing times and higher costs requiring separate processes and tooling for manufacturing each region.

In addition, undesirable physical deficiencies in this approach may result. Design problems may include an increased overall mass of the panel with which the composite core is associated, and sharp gradients in material characteristics at layer borders. Panels and other composite structures are ubiquitous in modern vehicles and other transportation systems. The cumulative effect of this problem can compromise overall performance of the transport structure.

Further, when fabricating the common honeycomb structure, the manufacturer is by definition limited to the geometrical attributes of the honeycomb. Thus, the characteristics and properties of the resulting sandwich panel are circumscribed by the inherent characteristics and properties of the honeycomb geometry.

Manufacturers have attempted geometrical variations of the honeycomb to modify these characteristics. Such attempts, however, remain subject to the limitations and inflexibilities imposed by present manufacturing methods, such as the expense of custom tooling to accommodate the variations.

A fundamentally different approach is needed to overcome these obstacles.

SUMMARY

Custom panels for use in transport structures and the manufacture thereof will be described more fully hereinafter with reference to various illustrative aspects of the present disclosure.

In one aspect of the disclosure, a panel for use in a transport structure includes at least one face sheet, and an additively manufactured (AM) core affixed to the at least one face sheet and optimized to provide a varying strength across at least a portion of the AM core for supporting expected load conditions.

In another aspect of the disclosure, a method for producing a panel for use in a transport structure includes additively manufacturing a core, including optimizing the additively manufactured (AM) core to provide a varying strength across at least a portion thereof for supporting expected load conditions, and affixing the AM core to at least one face sheet.

It will be understood that other aspects of custom panels and composite structures for use in vehicles and other transport structures, and the manufacture thereof, will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of the methods and apparatuses for additively manufacturing transport structures will now be presented in the detailed description by way of example, and not by way of limitation, in the accompanying drawings, wherein.

DETAILED DESCRIPTION

Figure 1:
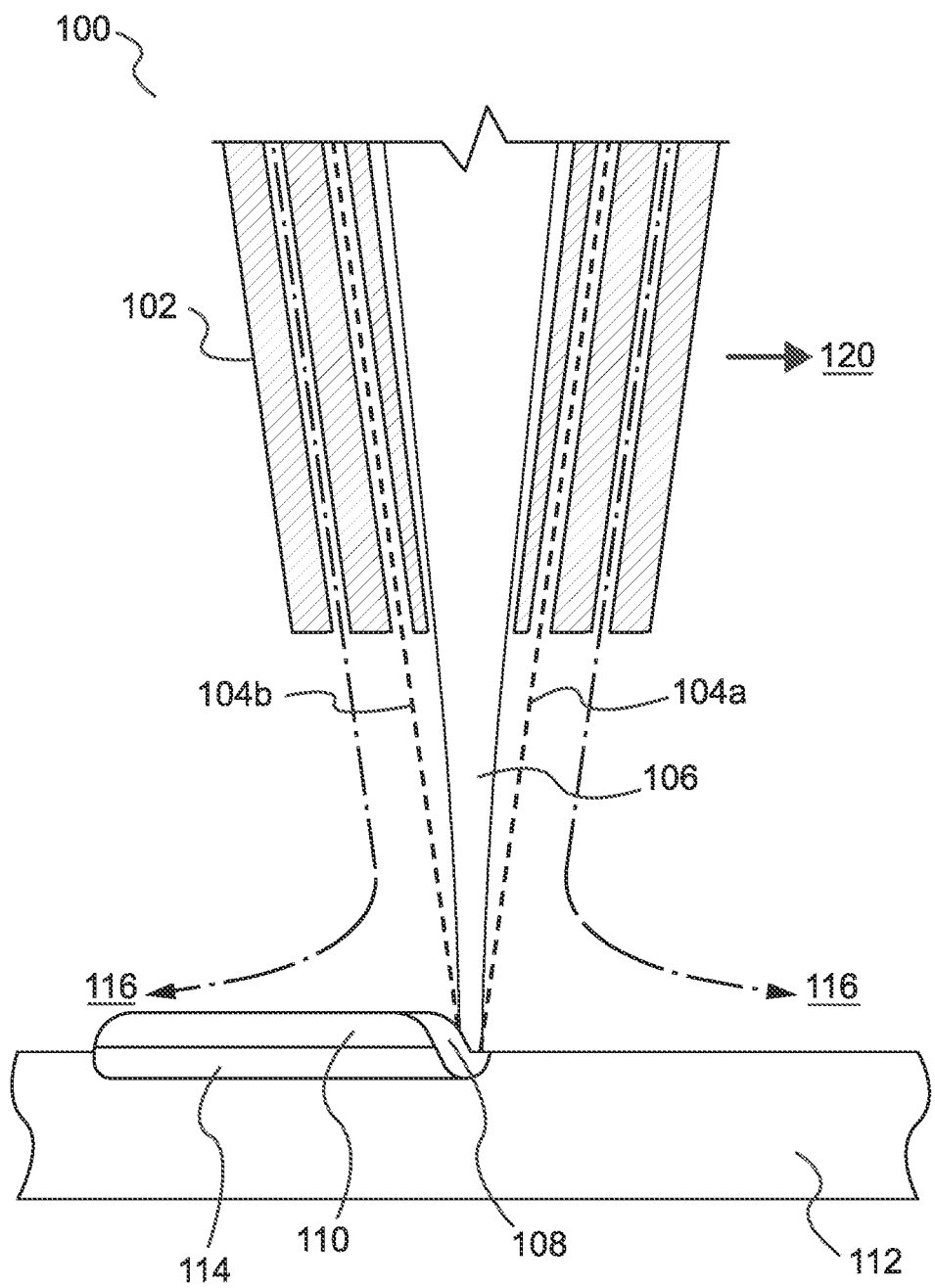
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "example" and "exemplary" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

This disclosure is directed to the manufacture of panel structures using specific additive manufacturing techniques to realize optimized core structures for said panel structures. In an exemplary aspect of the disclosure, certain components of such transport structures can represent modular components including composites having tri-axially optimized characteristics. As shown below, the combination of the additive manufacturing techniques with the modular and tri-axially optimized properties of the constituent transport structure components may be used to add overall value and efficiency to the end product and the assembly process. In addition, such techniques can provide distinct advantages to a user. These points are addressed in greater detail below.

Manufacturers that stand to benefit from this proposed combination of features include those that manufacture virtually any mechanized form of transport, the assembly of which often relies heavily on complex and labor intensive machine tools and molding techniques, and whose products often require the development of complex panels, nodes, and interconnects to be integrated with intricate machinery such as combustion engines, transmissions and increasingly sophisticated electronic techniques. Examples of such transport structures include, among others, cars, trucks, trains, boats, aircraft, tractors, motorcycles, busses, trains, and the like.

The techniques disclosed herein optimally lend themselves to the assembly of tri-axially optimized core-based structures, including the tri-axially optimized core-based structures and systems, methods, and apparatus, for forming tri-axially optimized core-based structures. Furthermore, while the systems, methods, and apparatus are generally described with respect to tri-axially optimized core-based structures, it will be understood that these systems and methods may be used to optimize core-based structures in only two dimensions when necessary. (As discussed above, traditional composite materials may provide an inner core that is stiff in only a single direction.) As used herein "optimized" in a particular direction may mean strengthened, stiffened, supported, reinforced, braced, or hardened in the particular direction, as applicable in the context and/or based on an objective or a given panel application. More particularly, tri-axially optimized may mean strengthening, stiffening, supporting, reinforcing, bracing, or hardening as much as is needed in each of three-axes. The strengthening, stiffening, supporting, reinforcing, bracing, or hardening may vary from direction to direction. Furthermore, the strengthening, stiffening, supporting, reinforcing, bracing, or hardening may include some increase with respect to the needed support for a given design. For example, structures may be designed for 100%, 150%, 200%, 500% or some other percentage of the expected load for along a particular axis. The percentage may vary from axis to axis.

A controller (including but not limited to controller 329 of FIG. 3D) may be integrated into a 3-D printer or embodied in a separate workstation and may be configured to execute one or more algorithms for optimizing the structural portions of cores depending on the intended application of the panels incorporating the cores. A data model may be created that includes a 3-D version of the optimized core. The data model may be provided to the 3-D printer for rendering. In other embodiments, the core is co-printed with the face sheets (skins) and optionally, one or more joining features (e.g., at a panel interface). In this case, the controller may include the face sheets and/or joining features as part of the same data model, or the controller may link the data models together to thereby enable the co-printing of the structures. (Thereafter, as demonstrated below, the structures may be joined via adhesives or mechanical fasteners to produce a finished panel section with the appropriate interfaces configured to interlock with adjacent panel sections).

In other embodiments, the controller 329 (or a controller on a separate computer) may be configured to optimize the core for the intended structural application and then print the entire panel (core and face sheets) as one integrated unit. In this case, there may not be a need for subsequent assembly of the panel sections. As discussed in greater length below, the optimized panel sections may be configured to include protrusions, sliding features, fasteners, and other mechanisms that enable adjacent panel sections to lock together at fixed angles.

The optimized core need not be rectangular or planar, and need not take on a fixed shape. The optimized core may be organically created with custom parts designed to provide the necessary structural support along all three coordinate axes (x, y, z) and may be designed to handle loads from any applicable direction without adding excessive or unnecessary mass to the panel. The core may also vary in thickness at any point. The core may have different densities in different regions and may incorporate both solid regions and empty or void regions at different locations. The flexibility to optimize the core based on any of these variables, together with the ability to shape the panel sections in any manner desirable, allows the resulting panel to be used in a virtually unlimited array of applications.

The face sheets may be 3-D printed (separately from the core or co-printed with the core) or conventionally formed (i.e., using traditional techniques). As will be illustrated herein, the face sheets need not be planar and instead can be curved or contoured in any geometrical configuration appropriate for the desired solution. The face sheets may be formed independently or by using the core as a tool. The face sheets may, but need not, have a uniform thickness and in other embodiments either one or both face sheets may vary widely in thickness. These principles are described further below.

Additive Manufacturing (3-D Printing).

The use of additive manufacturing (AM) or 3-D printing may provide significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that may not be possible to manufacture via traditional manufacturing processes or may be cost prohibitive to manufacture via traditional manufacturing processes. A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once. Other AM technologies include direct metal deposition (DMD) and powder bed fusion (PBF).

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104*a* and 104*b* into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
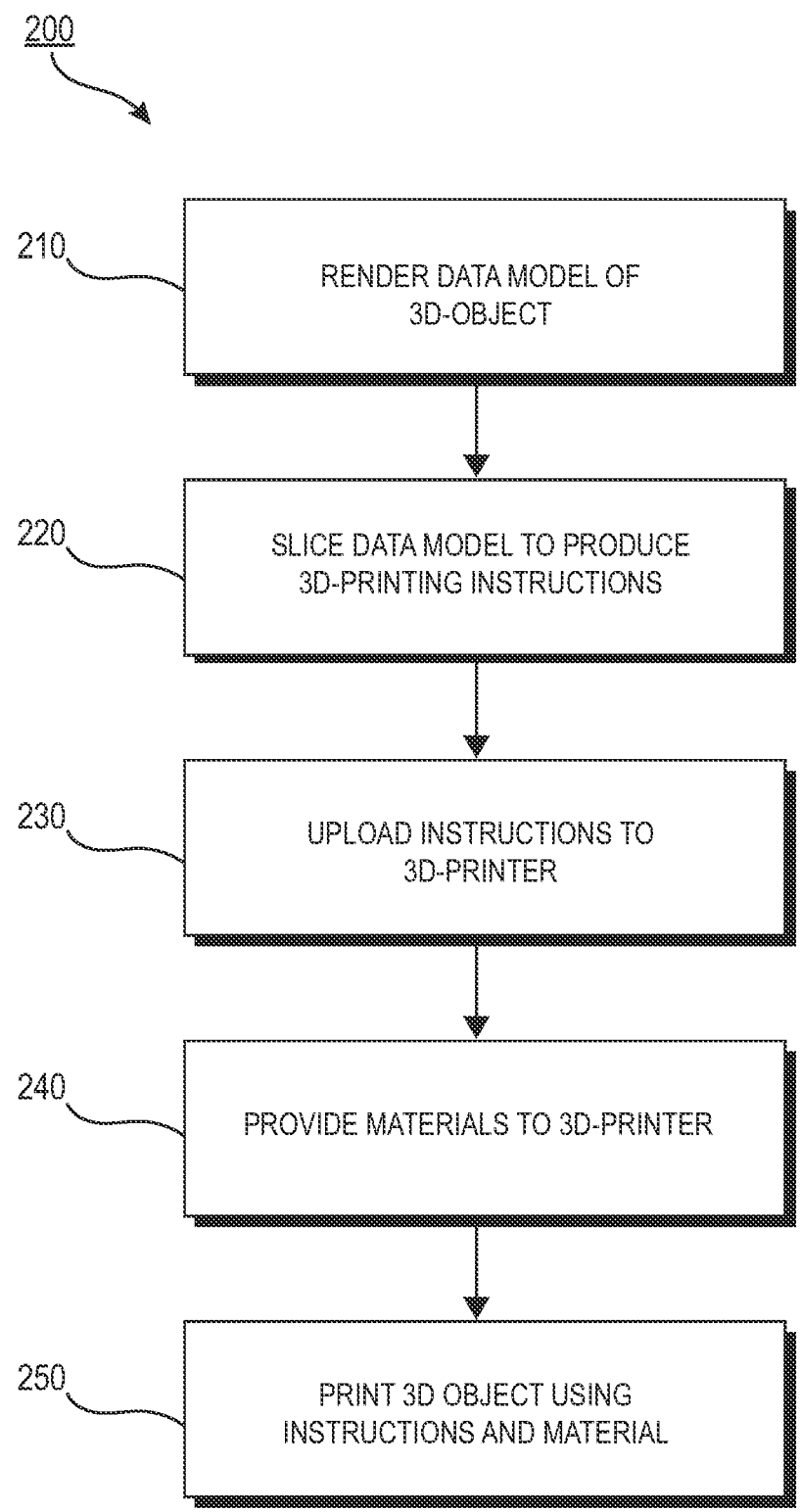
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including CAE-based optimization, 3-D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL (stereolithography) is one example of a file format associated with commercially available stereolithography-based CAD software. A CAD program may be used to create the data model of the 3-D object as an STL file.

Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses. For example, in some exemplary embodiments, a build piece may be additively manufactured using PBF, after which DMD may be applied to change a region of the build piece using a non-flat layer structure and/or layers having different thicknesses.

A common type of file used for slicing data models into layers is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
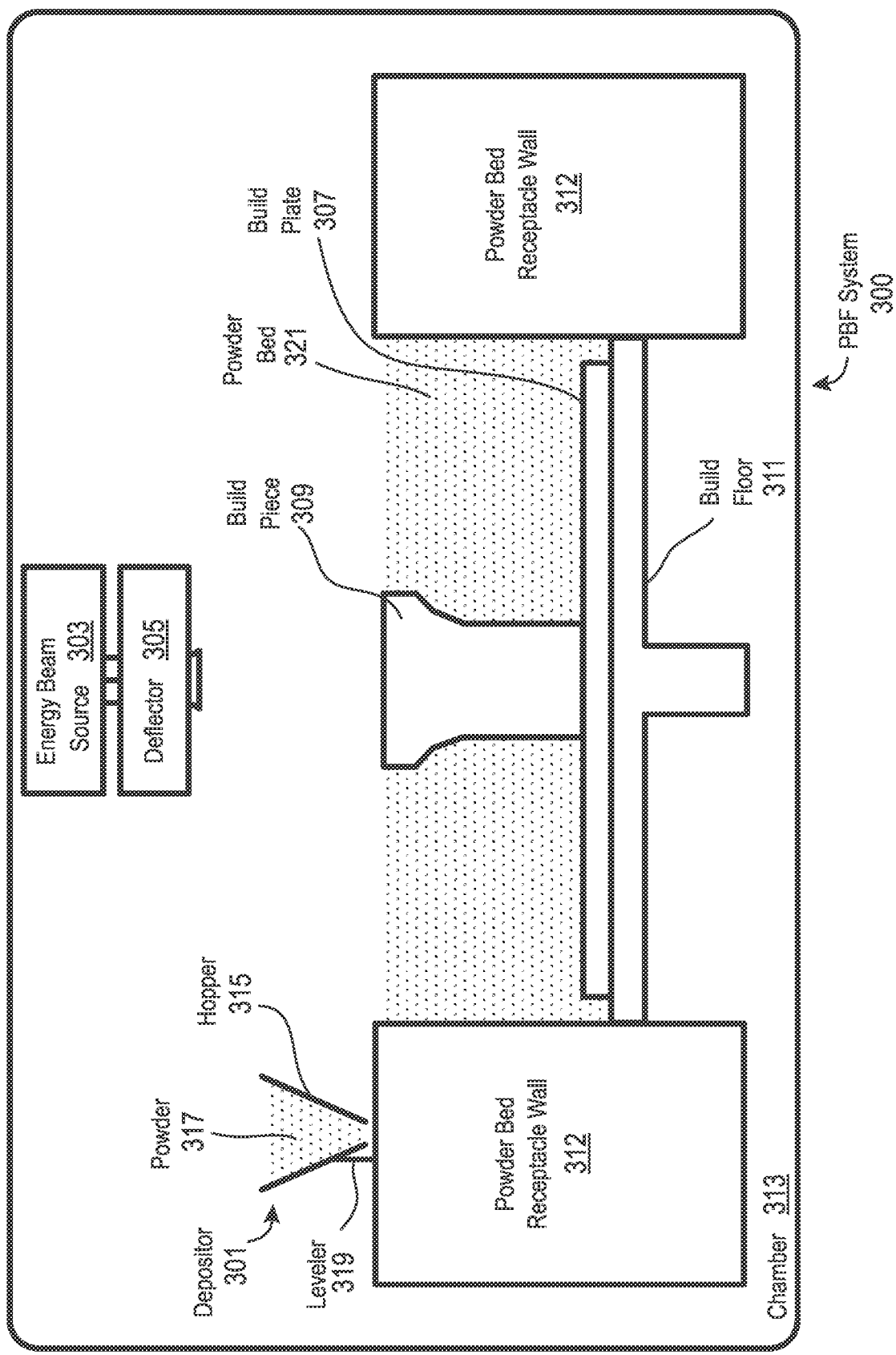
FIGS. 3A-D illustrate an exemplary powder bed fusion (PBF) system during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
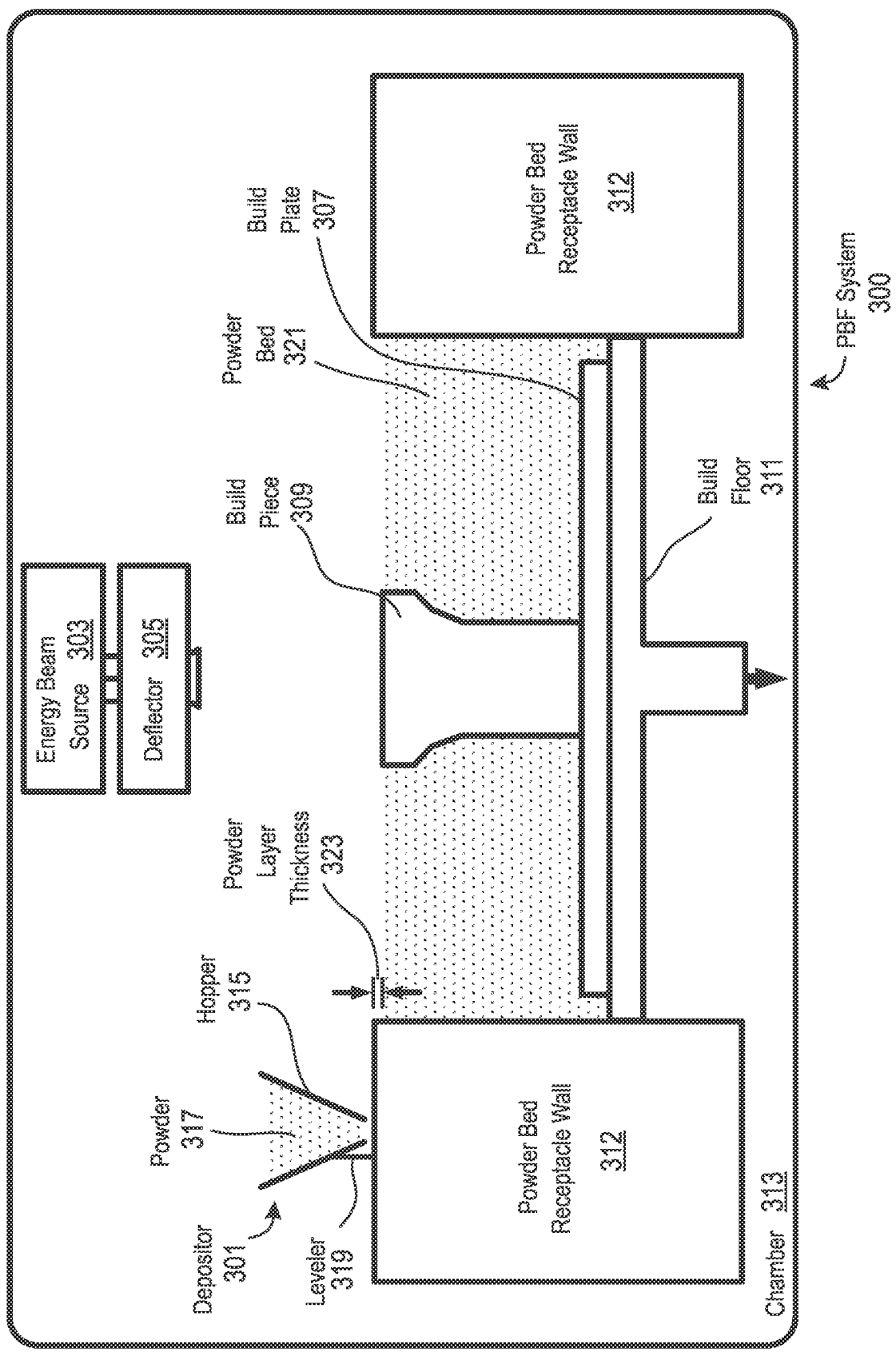

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
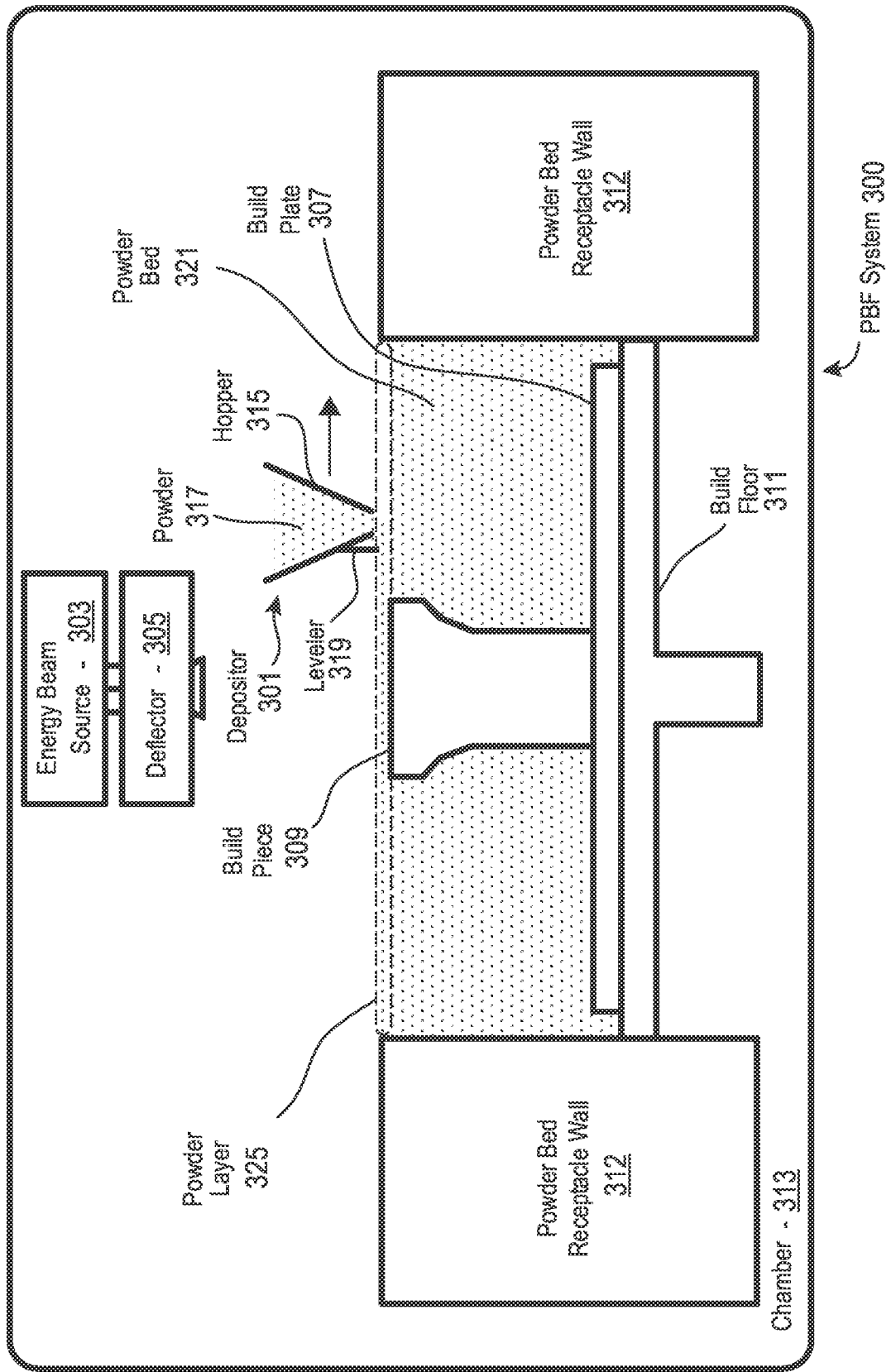

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 150 previously-deposited layers discussed above with reference to FIG. 3A.

Figure 3D:
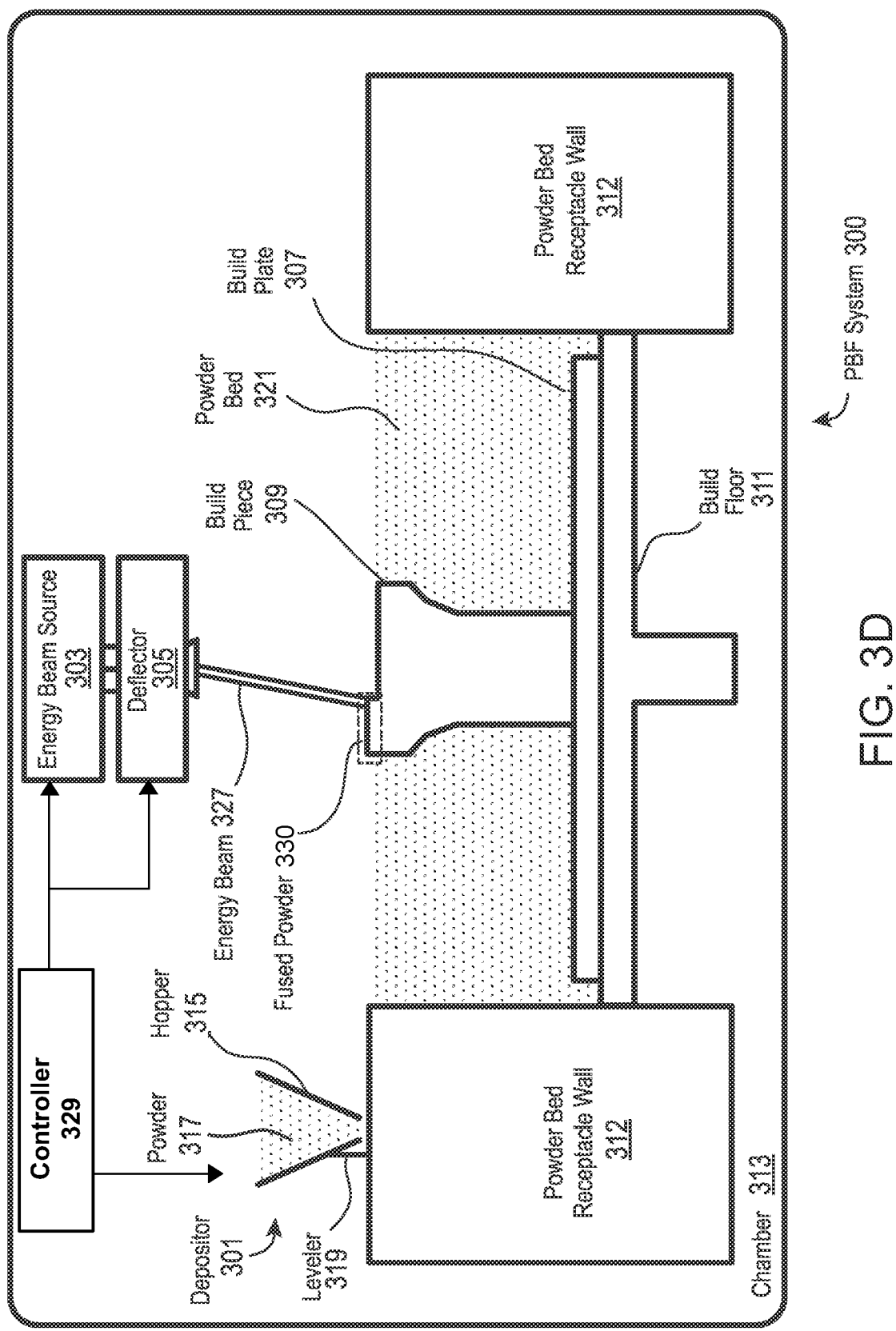

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas 330 designated to be fused. In various embodiments, energy beam source 303 can be a laser, in which case energy beam 327 is a laser beam. Deflector 305 can include an optical system that uses reflection and/or refraction to manipulate the laser beam to scan selected areas 330 to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

As shown in FIG. 3D, the PBF system 300 may also include a controller 329, which may direct the printing functions, such as optimizing the panel structure and/or controlling the build from the ground up. In some cases, these tasks are performed using different computers. For example, the data model of the panel, including the optimized core, may be provided using a remote server, which can then be received at the printer and compiled as a set of printing instructions compatible with the printer in use. The controller 329 may include one or more processors and memory for executing printing instructions for performing some or all the steps described above. For example, the controller 329 may execute code configured to direct the energy beam source 303 and/or deflector 305 to fuse selected regions of deposited layers of powder, code configured to direct the depositor 301 to deposit layers of material, to control leveler 319, and to control the vertical motion of the build floor 311, etc. The controller 329 may in some embodiments be fully integrated within the 3-D printer 300. In other embodiments, the controller 329 may be partially integrated within the 3-D printer 300, and/or the controller 329 may execute code on a computer system coupled to 3-D printer 300 for performing one or more of these functions. The controller may physically constitute one or more processors that reside locally or that are distributed throughout relevant portions of the 3-D printer 300. The processors may be connected by electrical connections, including one or more busses for routing electrical signals and digital logic to appropriate locations of the 3-D printer 300. The processors may include one or more microprocessors, digital signal processors, digital logic circuits, and/or any physical hardware or circuitry necessary to conduct the operation of the 3-D printer 300. The controller may be coupled to or include static or dynamic read only memory and/or random access memory, the memory may be volatile (e.g., DRAM) or non-volatile (e.g., EEPROMs), where the non-volatile memory may store code native to the 3-D printer 300, including firmware and startup routines.

It will be appreciated by those skilled in the art upon perusal of this disclosure that the core material discussed above need not be limited in application to panels. Rather, it will be understood that the core material may be used as part of or an interior of, or in connection with, other types of components in transport structures that may require isotropic features. In other exemplary embodiments, the core material may itself be considered a separate component to which the principles of the disclosure are applicable. Because the panel is ubiquitous in all types of transport structures, this structure will be used in connection with most embodiments throughout the disclosure.

One or more of the systems described with respect to FIGS. 3A-D may provide an apparatus for manufacturing an additively manufactured core material or other components. For example, one or more aspects of the system 300 may provide a controller, computer, or processing system (whether integrated into the PBF or standalone, in part or in whole) for receiving one or more design files characterizing a composite structure based on an analysis of expected loads on the composite structure including the core material within, or otherwise part of, the structure. For example, the system 300 may include memory, storage, and/or communications subsystems for receiving the design file(s). The system 300 may further provide an AM device similar to the one described in FIGS. 3A-D (or a different type of 3-D printer) for additively manufacturing the core material based on the received design file(s) and, in embodiments where the composite structure is a sandwich panel, the system 300 may further provide the AM device for use in co-additively manufacturing at least one face sheet and the additively manufactured core material, where the core material and the at least one face sheet constitute the composite structure. As another example, the system 300 may be configured to 3-D print both the core material and the at least one face sheet in separate print runs, or in parallel using more than one 3-D printer. As yet another example where the composite structure is a sandwich panel but the face sheets are slated for production using RTM or another non-AM process, the AM device may be configured to 3-D print just the core material base on the received design file(s).

The system 300 or a separate processing system, e.g., one or more processors and a memory system (including, for example, any of, or any combination of, a read only memory (ROM), random access memory (RAM), programmable read only memory (PROM), erasable programmable read only memory (EPROM), and/or electrically erasable programmable read only memory (EEPROM), and including a volatile memory (e.g., static RAM (SRAM) or dynamic RAM (DRAM) and a non-volatile memory (e.g., magnetic hard drives, solid-state drives (SSD), flash memory, etc., or any combination of the above), or Enterprise Server System, a personal computer, a workstation, a controller integrated into the system 300, etc. may provide a manner for analyzing the expected loads on the composite structure. For example, the system 300 or a separate processing system as described above may be configured to allow expected loads to be input (in a simulation or an actual build) and processing components to analyze the expected loads on the panel structure. The mechanism for analyzing the expected loads on the composite structure may include code executed by the processor(s), thereby causing the processor to perform the analyses. Such analyses may include determining an expected load, e.g., based on calculations or inputs provided, or conditions provided sufficient for the program to render the determination of the expect load, and determining the magnitude and direction of that load at various load points on the composite structure. The processing hardware and code may also determine how the expected loads will apply forces to the composite structure in one or more directions. The expected load may be an average load, a load over time, a determination of maximum and minimum loads, or some combination of these or other parameters. In some embodiments, parameters other than the expected load may be considered, calculated, and considered in the determination of the core or the composite structure design.

The system 300 or a separate processing system may provide or utilize code for determining a design for the core material based on the analysis of the expected loads. The mechanism for determining a design for the core material based on the analysis of the expected loads may include code executed by the processor causing the processor to determine a design for the core material based on the analysis of the expected loads. In an exemplary embodiment, determining the design may include further breaking down the concept of loading on the composite structure as a singular unit into loading on the composite structure at a range of locations within the composite structure.

Analyses using multi-physics models can determine failure points of a structure based on the loads the structure is expected to experience during actual use. By obtaining the failure points, materials can be chosen, and the analysis can run again. Typically, material properties (material, densities, strength, etc.) are inputs to the analysis. Results of the analyses can be used by the optimization algorithm. The optimization algorithm would optimize the layout of material in a given space for a given set of loads and boundary conditions. These loads and boundary conditions may be determined through analyses described previously. Accordingly, in an embodiment, an optimization algorithm can be run as follows:

1. A structure (e.g., a panel and/or core) is modeled.
2. Inputs for the structure are identified based on specifically identified material properties. The material properties ordinarily correspond to the properties of the initial physical material(s) used in the panel or core. Additional or alternative inputs deemed relevant to the analysis may also be used.
3. The structure is subject to a plurality of loads (which may include, for example one or more load/force vectors asserted at various points of the structure, over a period of time or otherwise), and to boundary conditions.
4. Material is generated based on these inputs. This is the output of the optimization. The optimized part may be subject to analyses, and failure points may be determined by the multi-physics models. Failure points are identified. Failure points may include, for example, locations of the core or panel where the material cracks, gets crushed, deforms, or breaks. In some embodiment, these failure points may include times of failure.
5. Based on the identified failure points, one or more materials can be chosen for use in the panel/core. The subsequent choice of material(s) can be performed by the optimization algorithm, or it can be performed manually. In either case, the material(s) are generally chosen that are anticipated to address the failure points. Critical failure points may require materials that are stronger or more robust. In some embodiments, the geometrical parameters of the panel may be modified, if appropriate. For example, the core geometry is changed to address the failure points.
6. The optimization algorithm is rerun based on inputs corresponding to the chosen one or more materials.

In various embodiments, the optimization algorithm can be run any number of times until it converges on an acceptable solution. An acceptable solution may include, for example, a core composition and geometry that is conducive to receiving and withstanding different loads in different directions and that has a more gradual load-bearing gradient, in contrast than a panel portion being strong in a single direction and an immediately adjacent panel portion being strong in the opposite direction, as is often seen in conventional approaches. At this point, the panel geometry (including the core geometry) and constituent materials can be identified and used in a data model to print the desired AM core.

The system 300 or a separate processing system may utilize code for generating the design file(s) based on the determination of the overall design. A design file may, for example, include a matrix of locations and material densities or specific energy beam processing parameters that correspond to the locations or specific energy beam processing parameters. The material densities may, in turn, be based on strength needs, flexibility requirements, etc. at a given location within the composite structure. In other embodiments, the composite structure may be designed to be stronger than the needed strength by some factor, e.g., 200%. These and other considerations can be taken into account when the processing system determines the required material properties for the composite structure in different locations and directions.

While the system 300 or the separate processing system may utilize expected loads, strength measurements, and material densities in the above calculations, the actual design of the core may include additional or different calculations involving other parameters or material properties not specifically referenced herein. Thus, other parameters and material properties may be considered by the processing system and are deemed to fall within the scope of one or more embodiments herein. In short, the processing and calculations leading to the structural design of the core as disclosed herein can advantageously account for desired values of properties in each location and in each of the X, Y and Z directions and any intermediate direction therebetween. The variable of time may also be considered. The material composition of the core and its attributes at each location and direction may therefore be precisely determined. The code may provide instructions to the 3-D printer to build the core in accordance with the composition and attributes.

The above-described technique is in contrast to conventional solutions in which cores or similar components comprise multiple separate layers, sections, or regions of material, wherein each layer is individually manufactured to provide a desired material characteristic that is prominent in a single direction. The end result using conventional approaches is a multi-tiered core whose desired material properties are segregated throughout the different layers, sections or regions. The conventional approach may lend itself to compromises in performance in that, among other potential problems, different layers or regions may adversely affect the properties of other layers or regions in the same composite structure. The conventional approach further tends to result in components having a potentially significantly greater mass, which increases fuel consumption. The conventional approach further increases production times, because it may require multiple individual builds to create each layer, section or region. Additional manufacturing steps may be necessary to adhere the layers together. The embodiments disclosed herein provide a solution to these problems by allowing the composite structure to be formed in many or most cases as a single build, or a substantially limited number of builds, whereby all of the desired traits and directional attributes of the core are integrated into a single structure.

As noted above, the cores that form the panel interior can be made using a variety of densities, with greater densities reflecting stronger panels at the expense of an increased mass. Core structures for composite materials may be formed using AM. AM is non-design specific, which offers geometric and design flexibility that conventional manufacturing processes cannot. Furthermore, 3-D printing technologies can produce parts with very small feature sizes and geometries that are either significantly difficult or impossible to produce using conventional manufacturing processes. Very large components that exceed printer size specifications can be segregated at the design phase, 3-D printed in parallel and combined. However, 3-D printer sizes, and therefore printed object sizes, continue to increase to drive demand. The versatility of AM and its ability to create highly complex structures represent a major impetus driving AM's increased adoption by the industry.

Multi-aspect printing. To streamline the manufacturing process and maximize efficiency in accordance with an aspect of the disclosure, multi-aspect printing is used. It may be desirable or necessary in many cases to produce components using a plurality of manufacturing processes. Conventionally, to accomplish this result, different dedicated machines are used. Thus, for example, a panel may be produced in part using DMD or PBF-based AM techniques, and then portions of the panel may undergo a finishing technique using FDM or spray forming processes. Additionally, subtractive manufacturing processes may also be implemented, for example, to remove unwanted materials from the 3-D printed panel or to further define features within a component.

In this conventional situation, the component must be transported between different dedicated machines for undergoing the plurality of different processes. The use of different machines can be time consuming and inefficient, and can add costs to the manufacturing of parts. These costs can increase substantially as production capacity increases.

In an aspect, these distinct functions may be combined into a single multi-aspect machine. In one exemplary embodiment, a single multi-aspect printer (MAP) includes two or more AM features. In other embodiments, the machine may include various subtractive manufacturing (SM) functions. For example, the MAP may incorporate functions performed by a CNC machine. MAP may include a robotic arm coupled to a tool for cutting material from a component on a substrate. The arm may alternatively be configured to receive one of a plurality of tools operable for performing different SM procedures.

The integration of multiple technologies into a single machine can substantially increase manufacturing speed and capacity, while reducing costs of labor otherwise incurred from moving the components and capital used for purchasing dedicated AM machines. Additionally, the combined functionality enables components to be printed in series or in parallel, increasing design flexibility and further maximizing production efficiency. Generally, the AM and SM operations of the MAP may be performed in any order.

MAP may include a single printer having a single print area using multiple print heads, including one or more DMD print heads, operable to print multiple areas simultaneously. MAP may be used to achieve greater versatility and speed in printing 3-D structures. MAP has the capability to set up and implement local PBF processing. MAP may also additively manufacture custom build plates needed for AM operations. In some embodiments, MAP can use DMD to produce "build plate supports" that attach to the printer plates and that support the attached build plate. These build plate supports may be attached below the build plate and can be made to be breakable from the build plate to enable the build plate to become part of the printed structure, if desired.

MAP may further include a robotic arm that introduces a build plate where needed in regions requiring the feature sizes and properties available with PBF. MAP may further include a robotic arm that may be used to introduce a build plate where needed locally in a larger chamber. A robotic coating arm may then coat the build plate and subsequent layers between sintering operations. MAP may further include a vacuum arm for removing excess powder upon completion of operations, allowing DMD onto PBF regions.

In one exemplary embodiment, the print heads may be printed in place by DMD. In another embodiment, MAP may incorporate fused deposition modeling (FDM) print capability including FDM extruders which heat and eject melted filament materials provided from FDM spools for printing thermoplastics and other materials ideal for internal supports and other functions where plastics may be beneficial.

Figure 4:
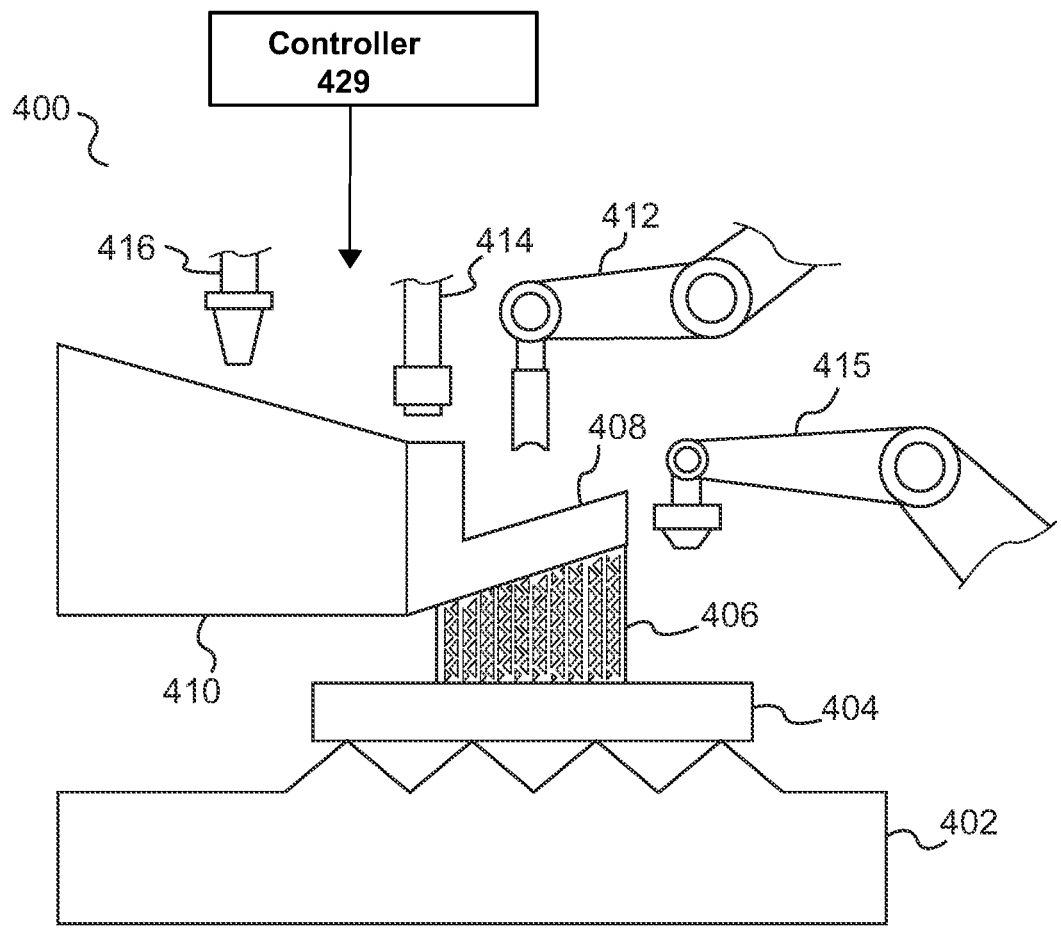
FIG. 4 illustrates a conceptual view of a multi-aspect printer (MAP) in accordance with an aspect of the disclosure.

FIG. 4 illustrates a conceptual view of a multi-aspect printer (MAP) 400 in accordance with an aspect of the disclosure. Referring to FIG. 4, MAP may include, as noted, one or more DMD heads or applicators 416 on a robotic arm assembly for 3-D printing a DMD structure. MAP may further include PBF equipment such as electron or laser beam sources. For example, PBF laser 414 is shown disposed on a separate robotic arm assembly. The PBF equipment may further include deflectors (not shown), a local powder applicator 412 on another robotic arm assembly, and an FDM robotic arm assembly 415. As noted above, in other embodiments more than one print head or applicator may be included on a robotic arm. Alternatively or additionally, more than one robotic arm may include a print head supporting the same technology (e.g., DMD, PBF, FDM, etc.) There may also be a number of different types of PBF technologies employed on one or more robotic arm assemblies (e.g., SLS, SLM, etc.).

One or more of the applicators and robotic arm assemblies of FIG. 4 may be performing operations on a structure which in the embodiment shown includes a PBF structure 408 upon which a larger DMD structure 410 has been formed. The PBF structure 408 may be connected to FDM- and PBF-formed support structure 406 for supporting the PBF structure 408 and DMD structure 410. The PBF structure 408, in turn, is arranged on a local DMD build plate sub-structure 404 which is further supported by a larger DMD build plate support structure 402.

MAP may also include one or more tools for milling. MAP may also use FDM on the top layers of a build piece for surface finishing. Structures for facilitating SM techniques may also be provided, such as automated milling tools and the like.

In some embodiments, MAP may print a structure using DMD and, concurrently or subsequently, add a part with a build plate and an immobile supporting structure. Alternatively, MAP may 3-D print the build plate and then apply a robotic arm containing powder to implement a PBF process while having a laser positioned over the powder bed. The laser may point to a mirror, which can be mobile or stationary.

MAP can have wide applicability to the manufacture of transport structures and other mechanical assemblies. For example, MAP can print lattice panels located in non-crushable areas using PBF or FDM (in the case of plastic lattice panels). MAP can print metal vehicle panels using DMD. MAP can also use FDM to 3-D print support features. In the case of a curved panel, for example, FDM may be needed to print the corresponding lattice structures for supporting the panel. As noted above, FDM can also be used to provide surface finishing to increase quality of the 3-D printed parts. In other embodiments, MAP can 3-D print support materials using a combination of FDM and PBF technologies. These supports can optionally be broken off following the AM process on the object being printed.

In another exemplary embodiment, MAP may include spray form capability. Spray forming is the inert gas atomization of a liquid metal stream into variously sized droplets (10-500 microns) that are then propelled away from the region of atomization by the fast-flowing atomizing gas. The droplet trajectories are interrupted by a substrate which collects and solidifies the droplets into a coherent, near fully dense preform. By continuous movement of the substrate relative to the atomizer, large preforms can be produced in a variety of geometries including billets, tubes and strip. The addition of a robotic arm for spray forming provides yet additional versatility to MAP.

Further, as described above, MAP may incorporate one or more SM processes. For example, MAP may include a CNC computer-controlled arm for use in accurately removing material or structure where needed.

In addition, MAP may include multiple arms and/or print heads for performing the same AM functions in a faster manner. For instance, MAP may provide a plurality of DMD print heads for performing metal deposition in parallel, or more than one energy beam for implementing a PBF process.

The availability of multiple robotic arms performing unique functions also enables some AM processes to be conducted in parallel. For example, in manufacturing a panel, one section of the panel may be undergoing PBF processing while another section to which PBF techniques have already been applied may simultaneously undergo spray forming. Parts may also be 3-D printed in series, with one process immediately following another without delays associated with mobilizing the component to another printer or another production area.

MAP may be under the general control of a central processing system, controller or computer that executes instructions corresponding to each of MAP's different capabilities. The processing system may be operable to integrate these instructions together to provide a meaningful sequence of instructions that incorporate a plurality of MAP's capabilities into one overall manufacturing operation. MAP may include, for example, controller 429, which may be an integrated controller or it may be a distributed series of processors that control various portions of a MAP. Controller 429 may execute code to perform one or more of the functions of controller 329 discussed above with reference to FIG. 3D. Controller 429 may also include or may be linked to one or more memory systems that receive CAD or CAE files comprising data models and/or printing/processing/manufacturing instructions. In an embodiment, controller 429 can receive an optimized data model of a core for use in a panel. In other embodiments, the MAP may receive one or more data models externally from a separate CAD or CAE application, e.g., through a wireless or wired network connection. Controller 429 may also receive, via a network and memory, code for manufacturing one or more joining features for use with one or more panel sections.

In other embodiments where desired, MAP may include a number of modes for using individual AM or SM technologies. For example, MAP can be used in FDM printing mode to additively manufacture a plurality of exclusively FDM-based objects. To accomplish this objective, the processing system may, in general, include a variety of processing modes whereby different capabilities of MAP are exploited for specific applications. These modes may also include specific modes that utilize a plurality of MAP's features concurrently, where desired for efficiency or as an inherently-desired aspect of rendering a particular object.

The capability to additively manufacture parts enables the manufacturer to generate shapes, configurations, and structures that are not available in conventional manufacturing processes. Further, advances in AM technologies are expected to continue. Print speed is continually increasing. 3-D printer form factor has also seen regular advances. This means, among other things, that the area of the build platform as compared with the size of the component to be printed is becoming progressively larger as relevant as build plates and printer profiles cross unprecedented boundaries in size, speed and sophistication. The availability and suitability of candidate materials and chemical compounds for use in AM is likewise increasing, meaning among other things that the versatility of AM should continue to impact other applications and other parts of the transport structures.

In one aspect of the disclosure, complete transport structures are additively manufactured. For the purposes of this disclosure, AM techniques with automobiles are used to demonstrate the capabilities of these advanced manufacturing techniques. However, using substantially similar principles as outlined in this disclosure, practitioners skilled in the art will recognize that analogous patterns and identical principles can apply with equal force to numerous classes of transport structures—planes, trains, busses, boats, motorcycles, and aircraft to name only a few.

AM also provides modularity processes with the capability to define and build complex and efficient interfacing features that define partitions or borders between panels. These features can include indentations, tongue and groove techniques, adhesives, nuts/bolts, and the like. A further advantage of implementing a modular design for vehicles is ease of repair. Modular designs ensure easy access to virtually any component in the vehicle. In the event of a crash, the affected modular block simply can be replaced. The block(s) can also be co-printed with the remaining structure to save assembly time. The blocks can even incorporate in-situ scanning and observation to ensure accurate joining and repair of the modules.

Figure 17:
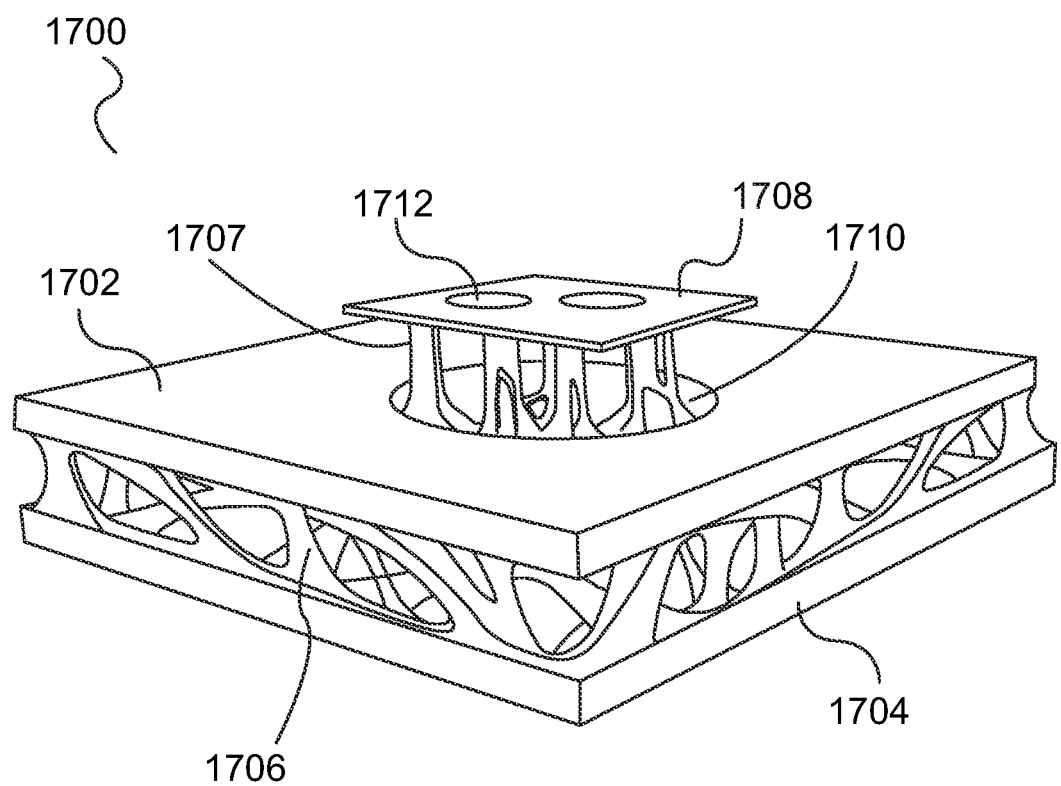
FIG. 17 is a perspective view of an exemplary AM panel having a cutout in the panel face sheet for incorporating features for fixturing.

Modular panel interfaces can be 3-D printed to include ports, protrusions, receiving slots, integrated fasteners, threading solutions, fastener receiving solutions, and/or panel orientation fixturing features. These solutions can provide alignment of adjoining panels at different angles, including right angles. More specifically, two panels can be joined together such that the cores of the panels include one or more structures that maintain the angle between the panels. The structures for implementing the interface may vary widely and may include a slide-in feature using a protrusion and a slot, an interlock solution using a fastener, a plurality of ports for glue, 3-D printed structure, a plate with threads that can mate with another plate using bolts, all of which are collectively used to implement the interface (FIG. 17). Examples of 3-D frames having various modular panel interfaces for connecting panels are shown further below with reference to FIGS. 17-22, below.

Using a modular design approach, the AM vehicle may be assembled as a collection of 3-D printed and non-printed components integrated together via some interconnection means for attaching the components at defined borders or transitions as noted above. Individual components may be added and removed without requiring changes to other components of the vehicle. Using a modular approach, the vehicle may be considered as a replaceable collection of assembled parts connectable into a functional transport structure via standard interconnects.

In another embodiment, the entire frame of the vehicle (and optionally other parts integrated within the frame) may be printed in a single pass or in a few renderings. Smaller parts of the frame may be printed if the frame is further subdivided into smaller modules. Such a modular frame structure, in certain embodiments, can make it easier to access parts of the vehicle underneath the frame.

In short, using the AM capabilities and modular construction techniques as described, 3-D printed vehicular components can be easily manufactured, and later reprinted and replaced as necessary. Repair and replacement is made possible for parts regardless of their complexity or of their current availability in inventory. Custom modular panels and other parts having a unique shape may be manufactured and assembled into an AM vehicle. Unlike conventional techniques in which adjacent parts of the automobile need to be replaced as well if one part is damaged during an impact, the parts to be replaced using the techniques herein may be limited to those that were affected by the impact.

It will be appreciated that in other embodiments, panels and other parts having modular features are not limited to being 3-D printed, but may also be constructed using other techniques, including the use of tooling or molding techniques, or other non-AM techniques, where necessary or desirable. Conversely, it will be appreciated that in still other embodiments involving specific conditions or manufacturing criteria, certain AM parts need not be defined by modular features.

Figure 5:
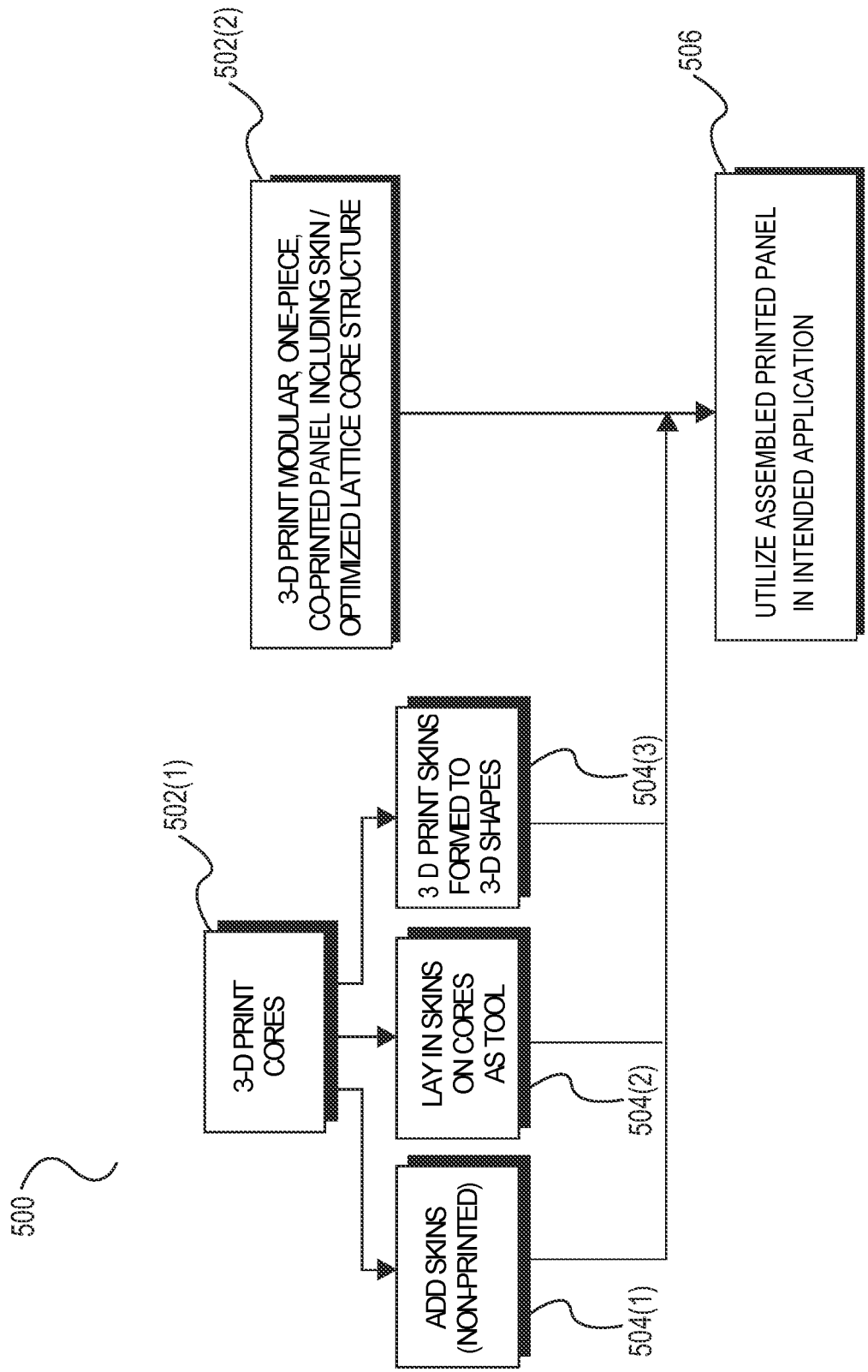
FIG. 5 illustrates a flow diagram of different exemplary methods for assembling a vehicle panel including a 3-D printed core and face sheets.

FIG. 5 illustrates a flow diagram 500 of exemplary methods for assembling an AM vehicle. FIG. 5 depicts three different manufacturing techniques: (1) 3-D printing the optimized core structure and then adding the skins using various techniques, to be subsequently assembled into the 3-D printed frame (i.e., 502(1) et. al); (2) Co-printing the skins and optimized core structure together, to be subsequently assembled into the 3-D printed frame (i.e., 502(2) et. al) and (3) 3-D printing the core and skins as a single integrated and assembled 3-D printed frame structure (also shown in 502(2) et. al).

At step 502(1) in one embodiment, the optimized core structure can be 3-D printed. In a first alternative following step 502(1), the skins (face sheets) may be acquired per design, or formed via another manufacturing method, and then added to the 3-D printed cores (504(1)). The skins may, but need not, be planar. For example, the skins may instead be curved or otherwise shaped to include a variety of non-planar geometrical features. For example, the 3-D printed core structure in step 502(1) may have curved surfaces on each side, and the skins added in 504(1) may be curved such that they fit into the respective sides of the core. In a second alternative following step 502(1), the materials comprising the skins are laid on the core surfaces using the cores as a tool (504(2)). In a third alternative following step 502(1), the skins may be 3-D printed in a manner such that they are formed to fit the contour of the 3-D printed core surfaces (504(3)). Thus, where the core surfaces are non-planar in nature, the skins may be 3-D printed to match the non-planar contour of the respective core surfaces.

It will be appreciated that in steps 502(1) and in any of subsequent steps 504(1)-(3), the 3-D printed cores and/or skins may be configured to include additional structures including cavities housing components that require an external interface, such as various types of joining features.

At step 502(2) in another embodiment, the skins and optimized lattice core may be co-printed. As in embodiments above, the co-printed cores and skins may be configured to include additional structures including cavities housing components that require an external interface. In some embodiments, steps 504(1)-(3) may also include using an adhesive, sealant, or mechanical fixture, as appropriate per the desired configuration, to bond the skins to the core. Subsequent to each of the three alternative steps 504(1), (2) and (3), the co-printing step 502(2), the assembled printed panel may be used in an intended application (506).

Figure 6:
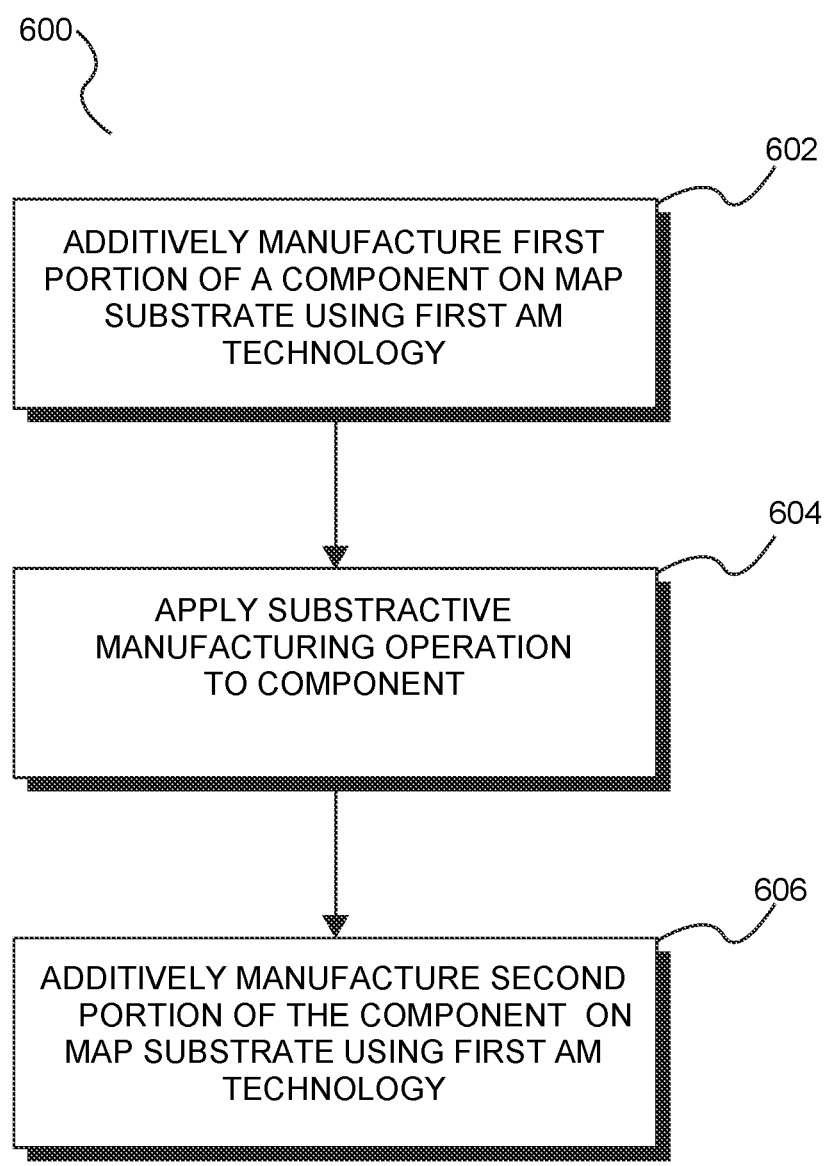
FIG. 6 illustrates a flow diagram of an exemplary method for producing a component using a multi-aspect printer (MAP).

FIG. 6 illustrates a flow diagram 600 of an exemplary method for producing a component using a multi-aspect printer (MAP). At step 602, a first portion of a component on a substrate of the MAP may be additively manufactured via a first AM technology. For example, a portion of a panel may be 3-D printed using selective laser melting (SLM) or another PBF technology. At step 604, a subtractive manufacturing (SM) operation may be applied to the component. At step 606, a second portion of the component on the MAP substrate may be additively manufactured via the first AM technology.

As an example of step 604, material may be cut away or removed to produce a hinge. The SM process 604 may be performed by the MAP in an embodiment. In alternative embodiments, step 604 may be performed subsequent to the AM operations in steps 602 and 606. In still other embodiments, step 604 may be performed in parallel with one or both of steps 602 and 606. In still other embodiments, a plurality of SM steps are applied at different times in the process.

In one embodiment, PBF or DMD technologies may be used in step 602 to produce a metal panel. While one portion or region of the metal panel is being printed in step 602, another portion of the metal panel that has already undergone 3-D printing via PBF or DMD may be further 3-D printed using FDM, for example, to provide a smooth finish. Alternatively, spray forming may be used to provide finishing in step 606.

The AM steps 602 and 606, above, may be performed in different orders. The AM steps 602 and 606 may, for example, be performed concurrently (in whole or in part), in series, or in any suitable order.

Figure 7A:
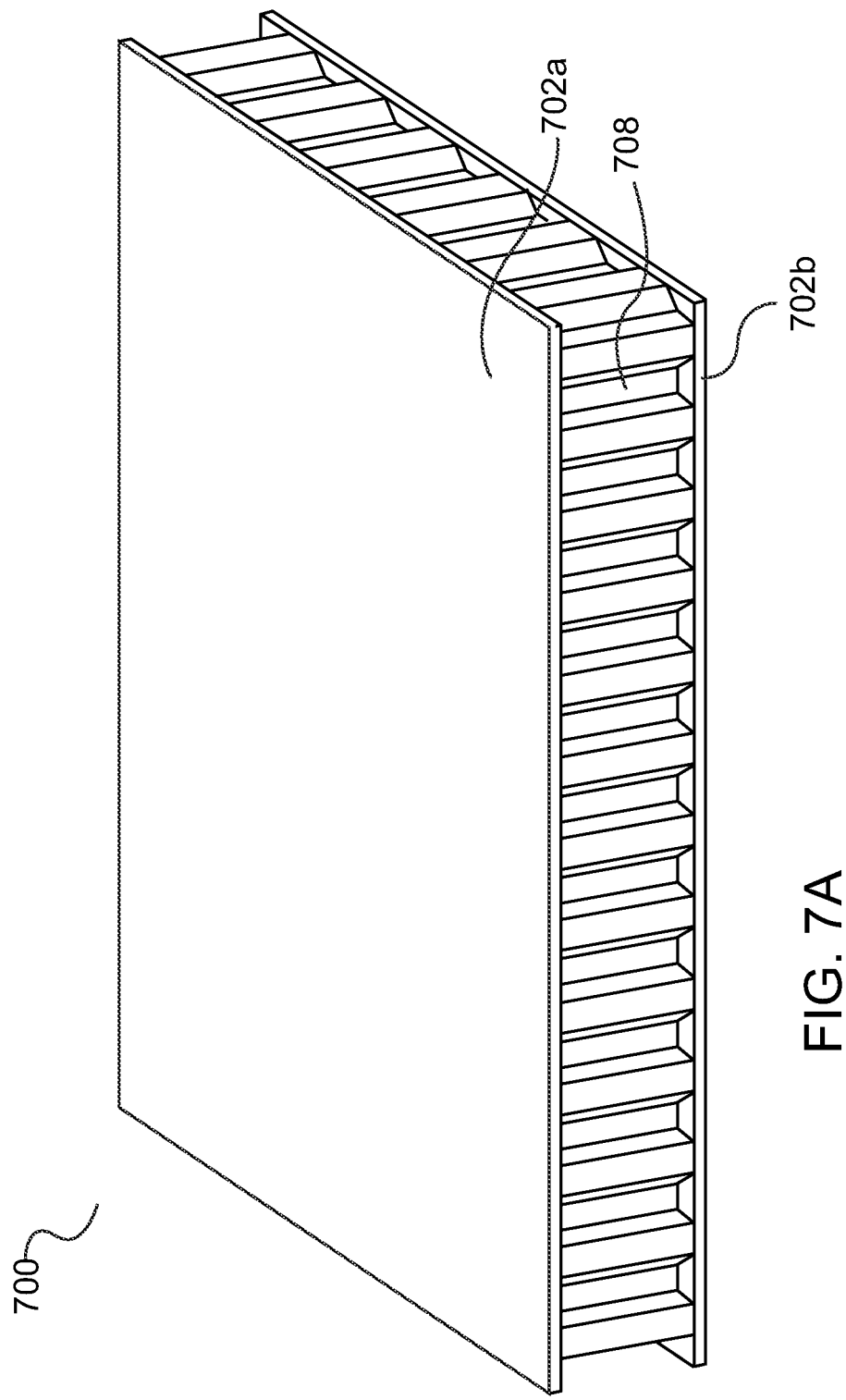
FIG. 7A illustrates a perspective view of an exemplary panel using a honeycomb lattice core.

FIG. 7A illustrates a perspective view of an exemplary honeycomb panel 700 with an additively manufactured core. Generally, conventional honeycomb panels have wide application in the automobile and aircraft industries (among many others). The panels can be used for floors. The panels can also be formed for use as components in interior and exterior doors, the hood, trunk area, fuselage (of an aircraft), frame of a boat, ship or spacecraft, and generally any area of a transport structure where paneling is needed. The panel 700 is a generally flat panel including a top face sheet 702a, a bottom face sheet 702b, and a core 708 disposed between the top and bottom face sheets 702a-b. The additively manufactured core 708 may include a matrix of evenly distributed hexagonal aluminum honeycomb, if desired. While a flat panel is shown, the panel may be curved or may include any appropriate geometrical shape. In an embodiment, the core 708 is additively manufactured. The panels, core or both can also be formed using other non-AM methods. The core can be formed with curved surfaces and it may vary in cross-sectional thickness or other non-planar characteristics. Skins or face sheets 702*a-b* can be formed on the curved surface. In some cases the skins can be formed using the core as a tool. In other embodiments, the skins can be additively manufactured, or separately manufactured using traditional methods.

Figure 7B:
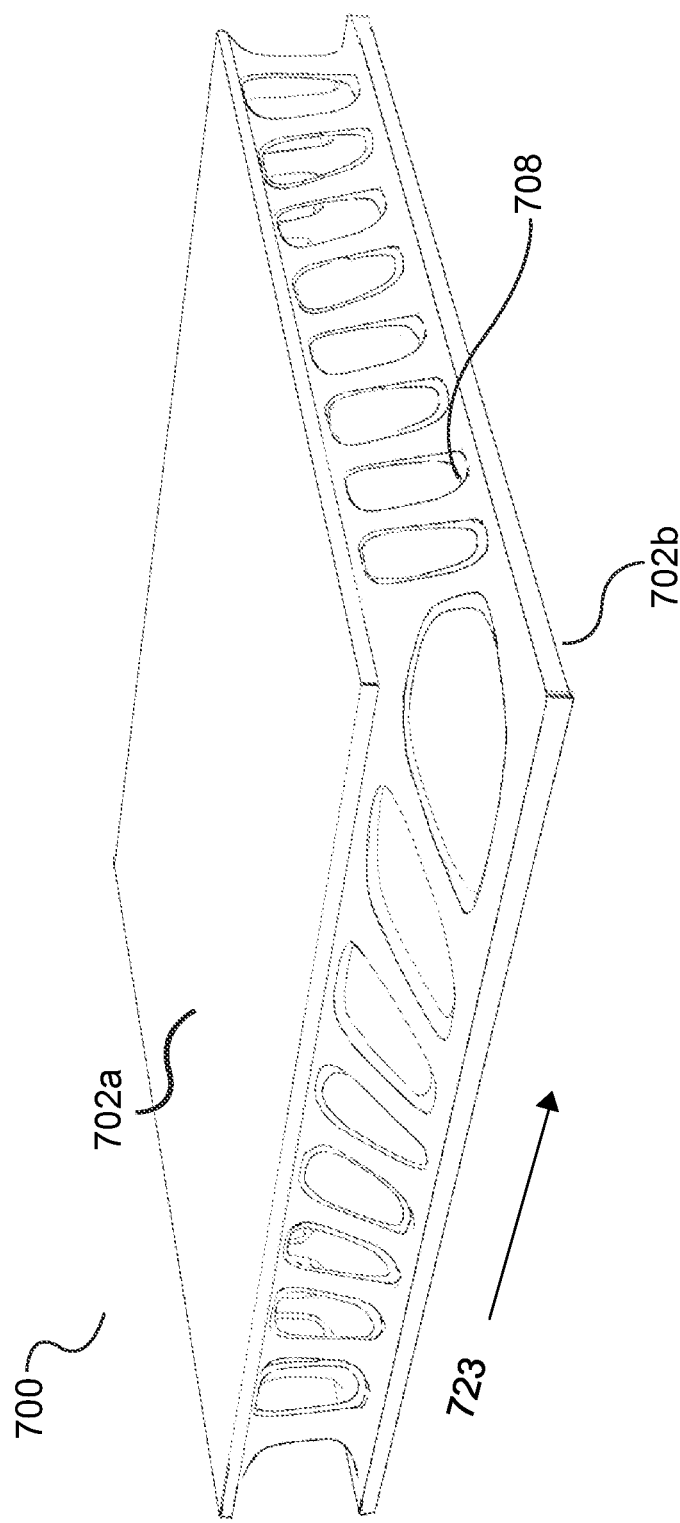
FIG. 7B illustrates a perspective view of another exemplary panel using a custom optimized core.

In an aspect of the disclosure, the additively manufactured core 708 may include unique arrays of lattice structures and/or custom honeycomb structures. FIG. 7B illustrates a perspective view of another exemplary panel using a custom optimized core. Like in FIG. 7A, the panel section in FIG. 7B includes face sheets 702*a* and 702*b* formed above and beneath the AM core. In some embodiments, the top face sheet 702*a* and the bottom face sheet 702*b* may be co-printed. In other embodiments the face sheets 702*a-b* may be formed using traditional methods. In either case, the face sheets 702*a-b* may be adhered to the additively manufactured core 708 using an adhesive. Alternatively, the face sheets 702*a* and/or 702*b* may be formed over the AM core 708 using the AM core 708 as a tool. The face sheets may be made of any material, such as, for instance, aluminum or a composite.

Referring still to FIG. 7B, the custom AM core 708 shows a number of generally vertical core connections forming semi-elliptical empty regions e.g., beginning at the left side of the arrow 723. Moving further along 723 in the direction of the arrow, the holes and protrusions begin to become diagonal. These different shapes of the AM core may account for different types of forces expected in the panel section, e.g., more vertical forces relative to face sheets 702*a-b* towards the left of 723, and greater shear forces along the panel as the core connections begin to veer diagonally. Any number of custom or patterned core material may be used and optimized for the panel at issue.

The AM core material in general may take on any of a variety of conventional or organic shapes, or somewhere in between, depending on the most ideal structural optimization for the panel application at issue. Conventional core material may include, for example, foam cores, which may include open or closed cell, and which may provide generally homogenous support of the skins. Other conventional core material may provide more structured, non-homogenous support of the skins including textile cores for punctual support, cup-shaped cores for providing regional support to both skins, corrugated cores that provide unidirectional support and honeycomb cores, which provide bi-directional support. In addition to these and other conventional core patterns, any type of custom core pattern can be generated and used on its own, or combined with any one or more conventional patterns. The optimization of the panel can take into account a number of parameters and the structural patterns of support can differ as a function of position at any point on the panel. Thus, different load magnitudes and directions can be accommodated at each point on an operational panel in an optimal manner.

The face sheets 702*a-b* may be additively manufactured, or in some embodiments, co-printed with the panel core. Alternatively, the face sheets 702*a-b* may be manufactured using conventional methods. For example, the face sheets 702*a-b* may be manufactured using a hand or automated composite layup, which includes laying dry fabric layers or prepreg plies onto a tool to form a laminate stack. The dry fiber laminate stack is infused with resin in a wet layup procedure, and the resulting materials are allowed to cure. Alternatively, a pre-preg laminate stack may be compacted after placement onto the tool and heated to allow curing. In an exemplary embodiment, the face sheets are produced using resin transfer molding (RTM). In RTM, a preform material may be placed into a mold, which is then closed. A specific resin mixture including a low viscosity resin for quick permeation and even distribution may be added to the mold via inlet ports. Vacuum may be used to facilitate the resin injection process. The part is then cured to produce one or both face sheets 702*a-b*.

In other exemplary embodiments, the face sheets 702*a-b* are produced using resin injection molding (RIM), vacuum assisted resin transfer molding (VARTM), resin film infusion (RFI), compression molding, injection molding, and the like.

Following assembly, the face sheets may be adhered to the additively manufactured core 708 as described. In some alternative embodiments, the face sheets 702*a-b* may be co-printed with the additively manufactured core 708. In these embodiments, the face sheets 702*a-b* may be adhered to the additively manufactured core 708 via an adhesive after the AM process has concluded. Alternatively or in addition, the face sheets 702*a-b* may be affixed to the additively manufactured core 708 using another conventional method, such as via thermal fusion or the like. The face sheets and core may also be built as one continuous AM build. Alternatively, the panel components may be co-printed, with the joining of the components done by an alternative AM process, if assembled in a MAP or similar process. Thus, for example, the MAP can co-print the panel components and then join the components, e.g., by applying an adhesive. The joining of the components can also be performed using a separate procedure, e.g., if a MAP is not used.

While the face sheets 702*a-b* of FIG. 7A-B are discussed as being affixed to additively manufactured core 708 directly or via an adhesive layer, one or more additional plies or layers of material(s) may be deposited between the additively manufactured core 708 (or adhesive layer) and the face sheets to optimize the core for the intended structural application without departing from the spirit and scope of the claimed invention. Also, in some exemplary embodiments, the additively manufactured core is a lattice-type structure. In general, however, any suitable core geometry may be used, with some geometries being desirable over others depending on factors like the target design objectives of the panel and the overall assembly of the transport structural into which the panel may be assembled.

In an alternative embodiment, face sheets 702*a-b* may be connected to respective sides of the additively manufactured core 708 during the AM process, as opposed to after the AM process.

The core 708 may use different inputs. For example, the core 708 may be additively manufactured as a honeycomb structure or another structure such as an optimized structure based on multiple inputs across physics models. The AM process, being non-design specific, may use instructions provided to a 3-D printer containing an optimized design of the additively manufactured core 708 to meet the objectives of an intended structural application. For example, depending on the application of the panel 708, such as for use in the flooring or as part of an interior side panel, etc., the optimization would enable the specification physical parameters (e.g., tensile strength, rigidity, thickness, force vectors including shear forces and vertical forces etc., pressures and gradients thereof, energy absorption characteristics by crush direction, etc.) and other potential geometrical, thermal, and material-based properties relevant to manufacturing the panel 700 for the intended structural application. In another exemplary embodiment, the panel 700 may be a section of a fuselage or vehicle exterior, in which case various aerodynamic characteristics may be optimized for that intended application by varying the shape of the face sheets in three dimensions. As described below, customizing the additively manufactured core for an application may simply involve describing the geometry of the desired structure in a data model.

In general, the instructions to the 3-D printer may provide a modified honeycomb structure (or other custom structure, e.g., lattice structure) that changes the properties of the panel to make it more suitable for a given application. This optimization process may conventionally be complex and involve substantial experimentation and design effort. However, according to certain aspects of the present disclosure, this potentially arduous process can be replaced wholesale, or at least substantially accelerated, using CAD or other software suites to form the core. The resulting data and instructions can be included as part of a data model representing the core along with the other parts, if any, to be additively manufactured. The optimized data model with the corresponding instructions can then be provided to the 3-D printer, which then renders the physical structure.

The CAD instructions and/or the data model of the structure can also be varied to produce corresponding variations of the honeycomb structure. One advantage at this point is that no tooling or other hardware is needed through this period; the design process can advantageously be replaced with algorithms for optimizing the panel itself, instead of the conventional time-consuming process involved in identifying or constructing expensive tooling to produce the core. More generally, what is conventionally accomplished using complex physical tooling and labor-intensive manpower, and in some cases inefficient trial and error methods, can now be accomplished in software and easily and efficiently converted to a hardware structure at a lower price using less labor.

The extensive versatility of 3-D printing also means that the designer is not limited to conventional honeycomb structures. Rather, in other exemplary embodiments, the core 708 can be additively manufactured using any type of structure optimized for the intended application, as will be described with examples below. After the desired additively manufactured core 708 is additively manufactured, a panel 700 may be formed by adhering plates 702a and 702b to opposing sides. In an exemplary alternative embodiment, the entire sandwich panel (additively manufactured core and face sheets) may be additively manufactured together, potentially with other co-printed structures. That is to say, in an exemplary embodiment, these structures can be additively manufactured together with the face sheets (like the panel 700 of FIG. 7). In alternative exemplary embodiments, these structures can be manufactured as individual core structures. These core structures may thereafter be incorporated into traditional honeycomb sandwich panel construction.

In addition, the printed or formed face sheets can in some embodiments vary in thickness at different locations, similar to the variable thickness of the core. Thus, some face sheets can both vary in thickness in contour. This enables a curved panel or panel with substantially any contour to be produced using the principles described herein.

Conventionally-produced honeycomb panels may result in anisotropic properties. Anisotropic properties are directionally dependent in that they vary in different directions. Different types of anisotropic properties may be important to panel design considerations in transport structures. Exemplary anisotropic properties differ per the material at issue and may include, for example, tensile strength, heat conduction, shearing forces, and other material-dependent properties. While anisotropic properties may be present in certain useful and high-quality materials such as, for example, carbon fiber composites, these properties are often an undesirable artifact for the applications of a custom honeycomb panel to which this disclosure is directed.

Additively manufacturing cores for sandwich panels, instead of using conventional manufacturing processes to fabricate the cores, can result in structurally optimized cores. Unlike traditional honeycomb panels, panels with additively manufactured core structures advantageously can offer quasi-isotropic properties, while maintaining the same or similar weight characteristics as conventionally manufactured honeycomb cores. Quasi-isotropic properties are those properties that are not directionally dependent in-plane. For example, a panel may exhibit quasi-isotropic features when the tensile stiffness and strength of the panel remain generally the same regardless of the direction in which the panel is pulled or otherwise subject to a tensile force in-plane.

Figure 8:
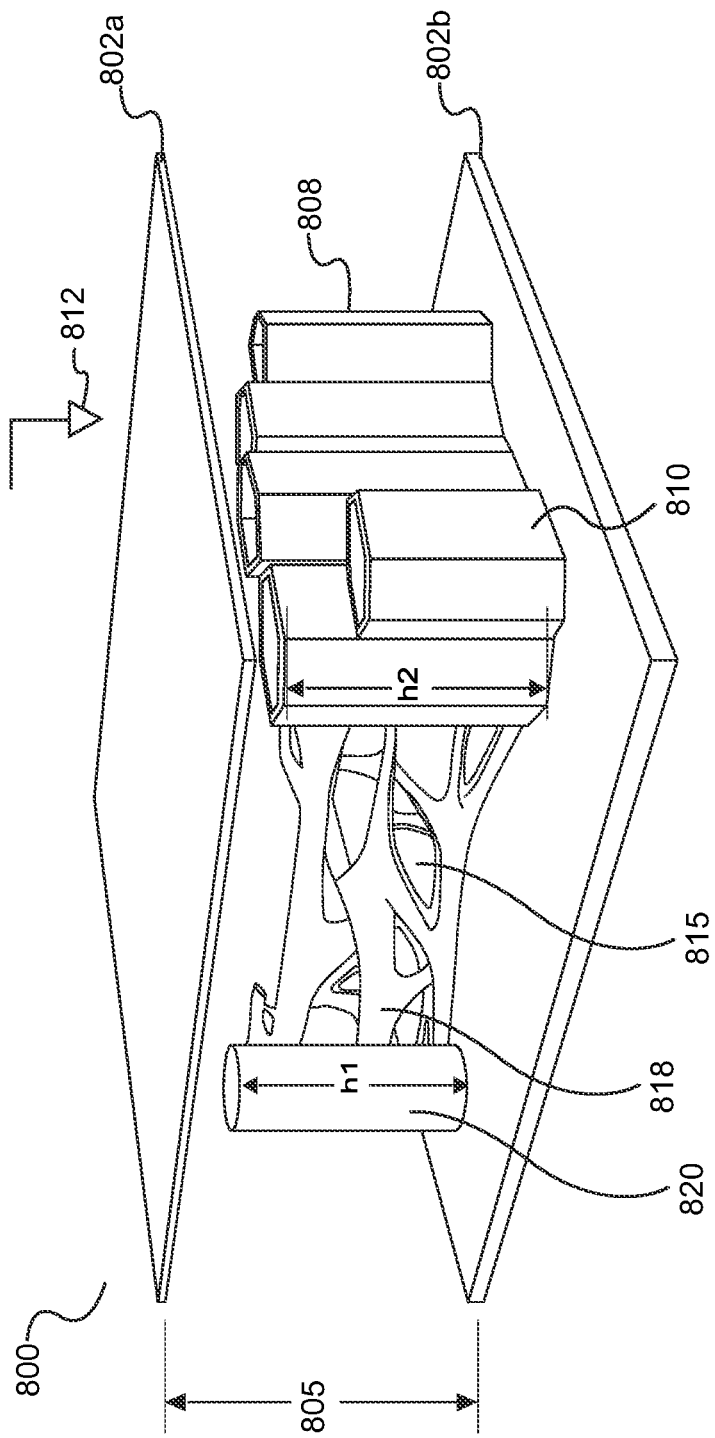
FIG. 8 illustrates a front cross-sectional view of an exemplary partially-completed AM panel having a custom internal structure and having the top face sheet detached from the core to show the core upper surface.

FIG. 8 illustrates a front cross-sectional view of an exemplary partially-completed AM panel having a custom internal structure and having the top face sheet detached from the core to show the core upper surface. More specifically, referring to FIG. 8, a front view of an exemplary AM honeycomb panel edge 800 is shown having a custom honeycomb structure with face sheets 802a and 802b, AM core 808, and an outer edge 805. A print mechanism 812 from a 3-D printer (such as an extruder or an energy source, depending on the printer type) may render the layers of the structure. In the example shown, the face sheets 802a and 802b are being co-printed with the core 808. This may occur in the case, for example, where the 3-D printer is a MAP, where the core and face sheets are made from the same metallic material, and other cases. However, in other embodiments where only the core 808 is being additively manufactured and the face sheets 802a-b are traditionally formed, acquired from a third party and/or 3-D printed separately, the face sheets 802a-b need not appear in this example. The 3-D printer may print the AM core 808 without the face sheets 802a-b or, in other embodiments, with the face sheets 802a-b. In this example, the additively manufactured core is a segment. As is evident from the illustration, the core 808 can be additively manufactured to include a wide variety of geometries. As shown, a number of hollow, generally hexagonal structures 810 are printed in a direction orthogonal to an inner surface of the face sheets 802a-b. These structures can, for example, be used to provide support without contributing excess mass to the panel. A larger number of hexagonal structures 810 in a region may suggest that additional strength is needed in that area of the panel. The different hexagonal structures 810 may also be made using different radial sizes such that the density (i.e., number of vertically-disposed hexagonal structures) may vary over different positions in the core 808.

In addition, where a significant amount of strength is needed in a direction orthogonal to the face sheets, one or more of the hexagonal cores 810 or the cylindrical core 820 may not be hollow and may instead be solid. These structures can have different heights, widths and densities. An additional cylindrical-shaped structure 820 of height h1 is shown. In addition, a plurality of elongated core structures 818 are shown running laterally between structures 820 and 810. The densities of these structures may vary. For example, in an embodiment, structure 818 may include one or more solid regions. Between the laterally-running structures includes an empty region 815. The shape and mass of these core materials may include virtually any configuration depending on the optimal load for the panel at issue. It will be appreciated that, even though skins 802a-b are shown as planar for purposes of simplicity, in practice skins 802a, 802b, or both of them, may be contoured to fit the core, and may be implemented with different thicknesses. The skins 802a-b may also include recesses to accommodate protrusions in the core that may be configured to interface with other structures. In the case where h1=h2, for example, the skins/face 802a-b sheets may be partially or completely planar. It is noted that the core structure in this example is incomplete, and the 3-D printer may add further structure to fill the panel.

At or near the outer edge 805 of the panel, one or more connection features or fasteners may be included in order to connect sections of panel 800 together at predetermined orientations. The flexibility due to the 3-D rendering opens the protrusions of the face sheets 802a-b and outer edge 805 to constructing or co-printing connection features for connecting to fasteners on other structures, such as 3-D joint members, fixtures, nodes, extrusions, other panels, etc. Thus, using the principles described herein, the intricate work associated with joining the panels can be performed quickly and efficiently by using additive manufacturing as a basis for constructing the core 808.

In an embodiment, the geometry of the AM core 808 of FIG. 8 described above may result from performing an iterative algorithm in which the core material and/or geometry is optimized based on identified failure points when modelling the structures using load-bearing and boundary conditions as per the exemplary algorithm described herein.

Figure 9:
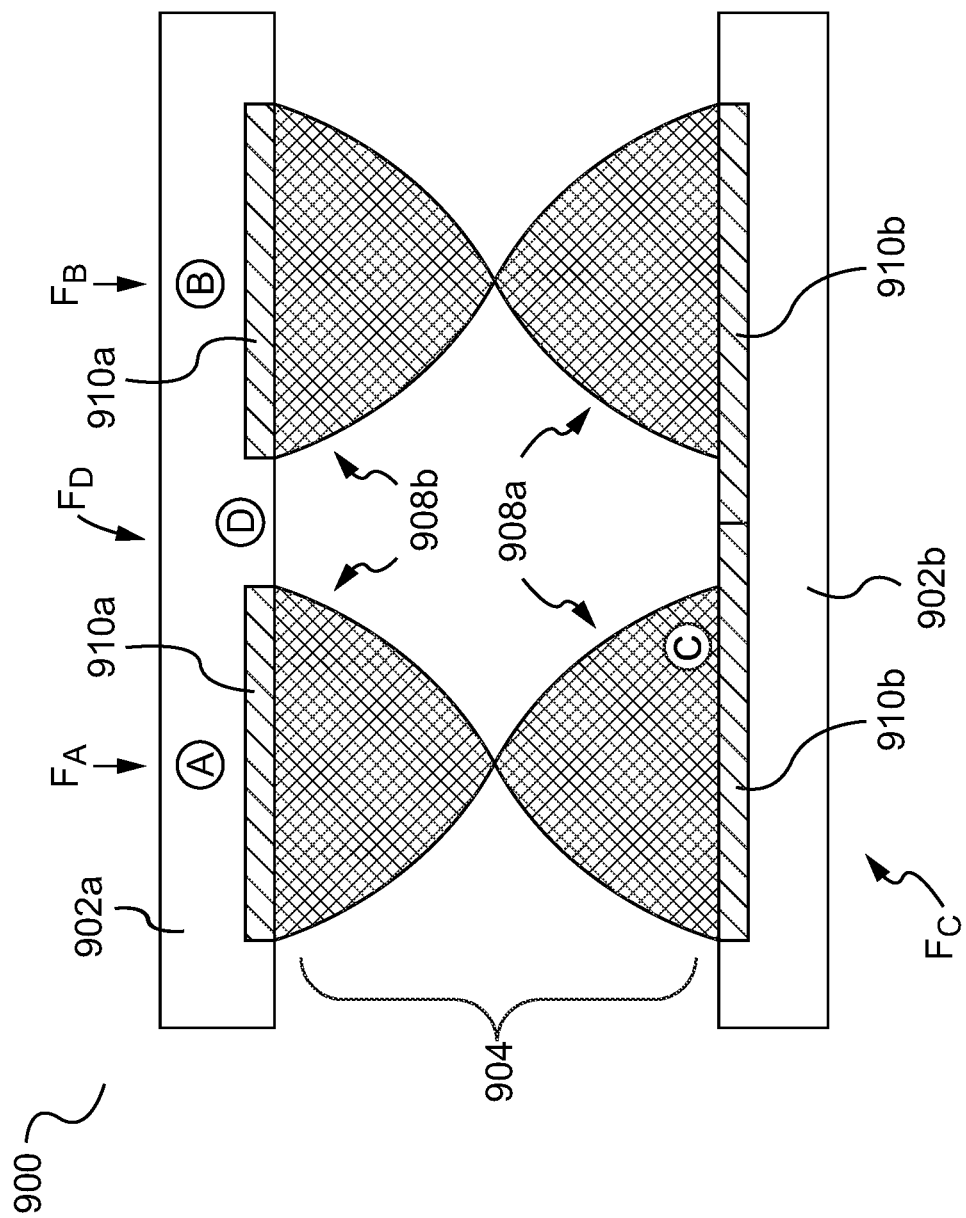
FIG. 9 illustrates a front cross-sectional view of an exemplary AM honeycomb panel using lattice branching to reduce sag.

FIG. 9 illustrates a front view of an exemplary AM honeycomb panel using lattice branching to reduce sag or panel deformation. FIG. 9 is not necessarily drawn to scale and may be made in any suitable orientation, width, length, height, etc. In one exemplary application, a custom panel may need to be a very light weight. At the same time, if the amount of conventional honeycomb material in the core is reduced to reduce the overall weight, this may cause the panel to sag in certain portions of the face sheet that receive forces but that have insufficient material to prevent deformation of the panel shape due to the sag. In aerospace applications, by way of example, the deformed shape may change the aerodynamic properties of a wing or other critical part of the aircraft where the panel resides. However, numerous additional applications may also be contemplated.

Referring back to FIG. 9, panel 900 includes face sheets 902a and 902b, additively manufactured core 904, lower lattice structures 908a, upper lattice structures 908b, adhesive region 910a and adhesive region 910b. The additively manufactured core 904 is additively manufactured using different geometries and based in some embodiments on a lattice design, including lower and upper lattice structures 908a and 908b. It should be noted that, while this illustration and other panel illustrations in certain figures may be in two dimensions, it will be appreciated that additively manufactured core 904 may include simple segments or alternatively, more sophisticated elliptical or other-shaped cross sections of lattice material. In other words, the lattice elements can take on any suitable shape. The lattice elements themselves may be complex, topologically-optimized structures that may have hollow regions on their interiors.

The intended application includes minimizing the overall mass of the panel (including additively manufactured core 904) while preventing deformation. In an embodiment, at lower lattice segments 908a, more material may be positioned in the lattice structure on the bottom face sheet 902b, or more support may be provided by adhering the lower lattice segments 910b together via expanded adhesive region 910b. As the AM core 904 is additively manufactured in the upward direction through structure 908b, the segments and material may branch out to provide support to face sheet 902a, but at a reduced mass and volume.

Depending on the embodiment, the panel may be constructed such that face sheet 902a will be interior to the transport structure and face sheet 902b will be exterior, or vice versa, or the panel may be entirely internal in the transport structure's interior. In any of these cases, the designer may recognize that the panel may experience a variety of forces. Gravity is one example. Additionally, the designer may recognize that in the embodiment at issue, the areas on the face sheet 902a designated as A and B may experience substantial vertical $F_A$ and $F_B$ forces on a regular basis. Accordingly, the panel may be custom designed such that the lattice provides additional support in those regions sufficient to prevent substantial panel deformation.

Conversely, at point D, the designer may recognize that the applied force FD will typically be smaller or in a direction closer to parallel to face sheet 902a, such that the panel need not require the same level of support at point D. Alternatively, it may be determined that certain deformation is permitted in region D. A similar analysis may be applicable to region C. A variable force $F_C$ may be applied, including in the direction shown. From the illustration it is evident that face sheet 910b, together with lower lattice structure 908a, may assist in resisting the force and preventing any substantial deformation. The point is that a large amount of flexibility is available to the designer in addressing solutions to problems using the techniques and panels herein, one of which may be reducing panel weight while addressing panel deformation caused by applied forces over time.

Referring still to FIG. 9, adhesive regions 910a and 910b may be present on respective face sheets 902a and 902b. In other embodiments, adhesive may be applied continuously over the panel regions. The face sheets 902a-b may be applied to the core 904 in a conventional layup, with the adhesive applied and allowed to cure. Alternative mechanisms of adhering the face sheets to the panel are possible.

Figure 10:
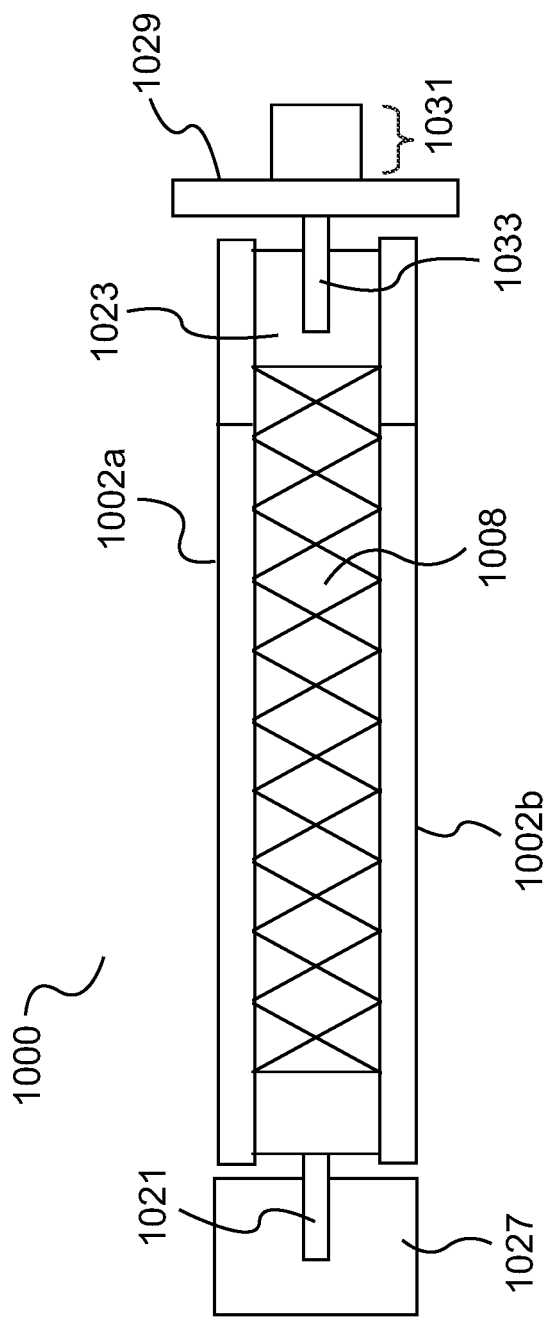
FIG. 10 illustrates a front view of an exemplary AM honeycomb panel connected to different types of structures using connection features.

FIG. 10 illustrates a front view of an exemplary AM honeycomb panel connected to different types of structures using connection features. Panel 1000 is not necessarily drawn to scale. Panel 1000 may include an additively manufactured core 1008, which may also be a custom honeycomb structure. The additively manufactured core 1008 may be additively manufactured out of a thermoplastic material. A connection feature 1021, which may constitute a tongue for fastening with another feature 1027, is also printed. In an exemplary embodiment, connection feature 1021 may be co-printed with additively manufactured core 1008. In another embodiment, connection feature 1021 may be metal and the structures may alternatively be printed separately. In the co-printing embodiment, the additively manufactured core may be co-printed using the MAP (FIG. 4) or any suitable 3-D printer that can render the different materials. In still another exemplary embodiment, metal connection feature 1021 may be 3-D printed using a PBF 3-D printer (FIGS. 3A-D) and the additively manufactured core 1008 may be 3-D printed using a FDM printer. It is noted that the structures need not be limited to plastic and metal as described above, and any number of materials may be equally suitable.

Referring still to FIG. 10, panel 1000 includes face sheets 1002a-b that may also be co-printed, or that may be conventionally manufactured, e.g., by being overlaid with an adhesive between the face sheet and additively manufactured core 1008 after the AM process has concluded. Panel 1000 further includes connection feature 1023, which may be a groove for receiving a tongue-like protrusion that is coupled to a connecting tube 1029. Also shown is 3-D joint member 1031 coupled to the connecting tube or extrusion 1029. In an embodiment, joint member 1031 is a type of node used for connecting a plurality of structures together. In one embodiment not explicitly shown, node 1031 is used to attach connecting tube or extrusion 1029 to tongue 1033 and the tongue 1033 is a connection feature that is part of node 1031.

Using additive manufacturing, custom panels can be quickly and efficiently manufactured to connect to neighboring devices and structures. The non-design specific nature of AM enables a manufacturer to co-print or separately print any number of different types of fastening structures or non-fastening structures. In an embodiment in FIG. 10, feature 1027 is a connection feature coupled to a separate node. In an embodiment, connection feature 1027 is additively manufactured. In certain embodiments, connection feature 1027 may be co-printed with panel 1000. Connection features 1027 and 1021 may be made of metal. In another embodiment, connection feature 1021 may be secured to additively manufactured core 1008 via an adhesive. Alternatively, connection feature 1021 may be integrated into the additively manufactured core in the AM portion of the manufacturing process.

Figure 11:
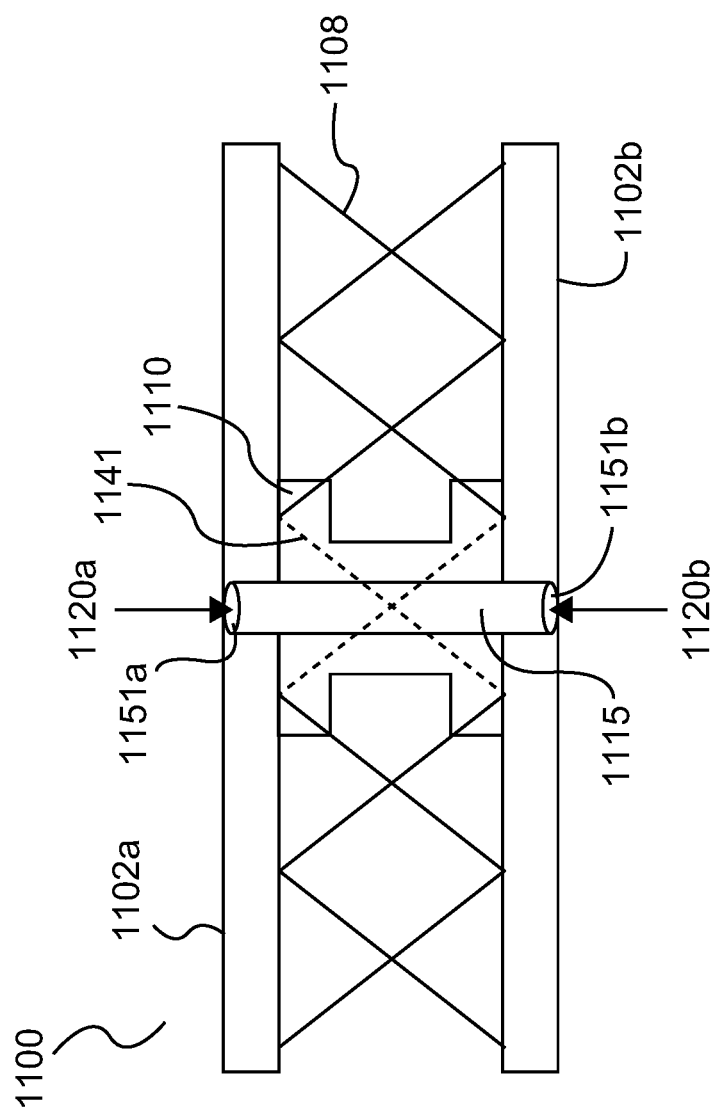
FIG. 11 illustrates a front cross-sectional view of an exemplary carbon sandwich panel having printed core material and a co-printed fastener insert.

FIG. 11 illustrates a front cross-sectional view of an exemplary carbon sandwich panel 1100 having printed core material and a co-printed fastener insert. Panel 1100 is not necessarily drawn to scale and is shown for illustrative purposes. Panel 1100 includes additively manufactured core 1108, which may, as usual include a custom or modified honeycomb structure. Face sheets 1102a-b are coupled to respective sides of additively manufactured core 1108 as previously discussed. In an embodiment, panel 1100 further includes an additively manufactured fastener 1110 with an insert 1115. In an embodiment, the fastener 1110 with insert 1115 are co-printed with and integrated into the additively manufactured core 1108. Insert 1115 may be threaded or non-threaded. Apertures 1151a and 1151b, which may be any kind of opening that enables access to insert 1115, are punctured into or otherwise built in the respective face sheets 1102a and 1102b. As shown by arrows 1120a and 1120b, the insert is accessible to an external connection feature of any suitable kind (e.g., bolt/nut combination, tongue, etc.).

While the panel 1100 of FIG. 11 is shown as a cross-section in two dimensions, it should be understood that in additional embodiments, the panel 1100 may include a plurality of fasteners 1110 dispersed in appropriate locations on the three-dimensional panel. For example, a plurality of fasteners may surround a periphery or portion thereof of the panel. Alternatively, an array of fasteners may be implemented across the surface of the panel 1100 to provide high connection strength throughout the panel to other features in the transport structure. In other configurations, the use of fasteners may be minimal to reduce weight while sufficiently securing the panel to adjacent structures.

Other types of connection features and fastening devices may be co-printed with panel 1100. In an embodiment, a structure similar to fastener 1110 is used except that, instead of the insert 1115 being used to fasten the panel to other structures, the insert 1115 may be a channel for enabling fluid flow to or from different sides of the panel. Insert 1115 may alternatively be filled with a solid material of a type dissimilar to the face sheets 1102a-b to provide panel 1100 with some thermal or structural characteristic. To this end, various exemplary embodiments contemplate that insert need not be limited to a round or elliptical region, but rather it may be a region that includes depth relative to the cross-sectional view in FIG. 11. In other words, the panel may have one or more openings that are elongated across the surface of the panel, or that are arranged in other orientations along the panel. Such openings in the panel, which may be motivated by a variety of considerations and are application specific, may be efficiently realized using the techniques described herein.

Referring still to FIG. 11, additively manufactured core 1108 provides a plurality of "X"-shaped characters to demonstrate the core's general presence rather than to define or limit its shape. X-shape 1141 is presented in dashed lines to indicate that the relevant portion of the additively manufactured core in the area of the fastener may be vacated to provide room to print the feature to accept the fastener. In some embodiments, the fastener 1110 may be integrated into the additively manufactured core 1108 using different materials in the AM process, or the fastener may be adhered to the additively manufactured core 1108 through some other means, such as applying an adhesive between the fastener and core via an adhesive inlet and vacuum channels (not shown to avoid obscuring the illustration). The adhesive channels may be co-printed with the additively manufactured core 1108 and/or the panel 1100 or built using conventional means.

Figure 12:
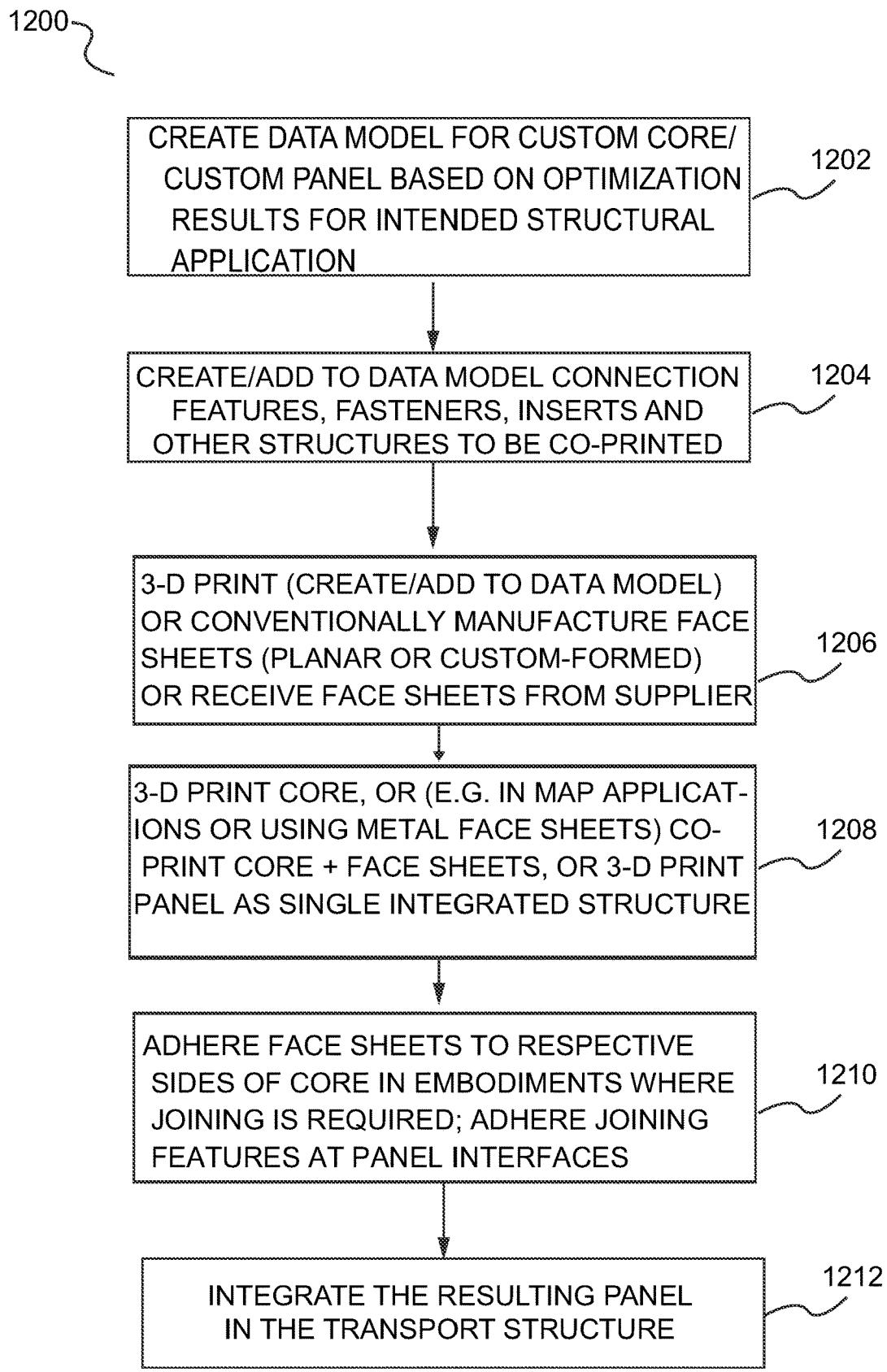
FIG. 12 illustrates an exemplary flow diagram of various exemplary methods for constructing a panel with an optimized core and for use in a transport structure.

FIG. 12 illustrates an exemplary flow diagram of a method 1200 for constructing a panel for use in a transport structure or other mechanized assembly. A data model is first created of the 3-D additively manufactured core using a CAD application (1202). The core may be uniformly shaped or it may vary in contour, shape, or thickness. In some embodiments as described in steps below, the data model may include the face sheets or the entire custom panel as integrated. Instructions for optimizing the additively manufactured core for an intended structural application may be present in the data model or in other locations as known in the art. These instructions may include (1) designating the overall architecture of the additively manufactured core (e.g., specifying the geometry and specific physical dimensions of each element of the structure) and (2) specifying the material(s)/composite(s) to be used for each area. Depending on the printer or application, the instructions may also include identifying other properties, such as temperature ranges, various material coefficients, etc. However, some or much of this information may already be inherently incorporated into the instructions once the geometry, physical dimensions, and materials to be used are identified. This is because the materials used may already have certain known properties or specifications. The composition and geometry of the panel or core may be determined using an iterative algorithm in which failure points are identified in a simulation, and the inputs for the panel are progressively fine-tuned until a desired structure is obtained, e.g., one that is configured to withstand specific structural loads without incorporating excess mass.

In embodiments where features are to be co-printed (or printed as connected to) the additively manufactured core, such as connection features, fasteners, inserts and other structures, these instructions and specification may be included with the data model identified in 1202 (or if the application requires, new data models for the features may be created and linked) (1204). In other embodiments, connection features and fasteners may be 3-D printed, conventionally manufactured separately or otherwise received from a supplier, and subsequently combined with the panel.

The face sheets may be 3-D printed provided from a supplier, or conventionally formed (1206). As noted, the face sheets may be planar or custom-formed, and may have consistent or variable contours and other properties (e.g., thickness). In cases where the face sheets are additively manufactured (on location or otherwise), one or more data models may be created, and the face sheets may be 3-D printed. For example, where the MAP is used and/or where the panels are metallic like the core, the panel elements (including the core and face sheets) may be co-printed or alternatively a single integrated panel may be printed. In this example, the face sheets may be included as part of the data model identified in 1202; alternatively, they may be included in a separate data model. In alternative embodiments, the face sheets may be custom formed and manufactured through conventional means, e.g., machining, tooling, casting, etc.

The AM core may be additively manufactured using the data model(s) described above (1208). Also, based on the data models, the face sheets may be 3-D printed individually or they may be co-printed with the core or as part of the panel. Any 3-D printer-specific procedures to effect the AM of the core are addressed, performed, and resolved.

The face sheets may be adhered or affixed to respective sides of the additively manufactured core (1210) in embodiments requiring this procedure. For example, where the face sheets are formed or the core is co-printed with the face sheets, the face sheets and core may be joined in this step. This step may also apply to other embodiments where the face sheet is formed using the core as a mold. By contrast, where a single integrated panel is 3-D printed, this step may not be necessary.

For 1210, this may be accomplished using conventional means such as a layup with an adhesive with vacuum, etc. Alternatively or additionally, the face sheets may be joined using additional mechanical fasteners. In some embodiments an intermediary layer is used. In various embodiments, panel connection features may be adhered or connected to the sides of the core. In other embodiments described above, the face sheets may be co-printed with the additively manufactured core and affixed to/integrated with the additively manufactured core during the AM process.

At 1210, joining features, fasteners, panel orientation fixturing features and other structures may also be adhered to the core to form a panel interface. In some embodiments the features may be 3-D printed with the skins or and/or the core such that it is already physically attached.

The manufactured panel may then be integrated with the transport structure (1212). For example, the panel may be used as an interior or exterior panel in an automobile, boat, train, bus, or aircraft. The panel may be used as an exterior wing or fuselage panel in an aircraft. The panel also has a variety of applications in the manufacture of trucks, trains, boats, and the like.

The core structure may be optimized for use in any intended application. The conventional core materials described above may use a uniform distribution. Referring back to FIGS. 3A-D, 3-D printing may allow for distributions other than a uniform distribution. For example, distributions may vary in two (x, y) directions or three (x, y, z) directions. A core that may be used as a support material for a composite structure may be designed to provide support in two or three directions. For example, tri-axially optimized core-based structures may be designed using the systems and methods described herein. The shape of an object and the forces applied to the object may be considered in all three directions. Accordingly, an analysis of forces in all three directions, e.g., x-direction, y-direction, and z-direction, may be performed prior to designing the object to withstand the forces in all three directions, either manually or through optimization. For example, a tri-axially optimized core-based structure may be designed to provide support in the x-direction, the y-direction, and the z-direction following analyses of forces. The tri-axially optimized core-based structures may be designed to provide 100% of the expected load or greater support, e.g., 100%, 150%, 200%, 300%, 500%, or any other percentage that may be selected. Each direction may be designed for a different load and/or a different percentage of the highest expected load. For example, the x-direction may be designed for 200% of the expected load, the y-direction may be designed for 300% of the expected load, and the z-direction may be designed for 500% of the expected load. (Other numerical values may be selected.) Furthermore, in an example, the percentage selected for a particular direction may be selected based on how often a maximum or near maximum load is expected to occur in a given direction.

In rendering these calculations in practice, any suitable units may be used. For example, the expected load on a core or other component in the context of a tri-axial optimization algorithm may be measured as an array of force vectors (e.g., each having a magnitude in pound-force, Newton, etc. and having a direction expressed using x-y-z coordinates, angular values relative to a reference plane, etc.). For average forces and other values, the expected load may also be evaluated as a force per unit time. In additional or alternative embodiments, the expected load may be seen as a pressure (force per unit area) on different regions. In short, a variety of anticipated or expected load measurement types may be used by the tri-axial optimization code as governed by the application and intended objectives. The output determinations may be equally flexible and may be provided as a proportion or density as a function of direction, or a percentage as reflected in the example above. Output determinations may also specify material types and their geometries, shapes of cells within materials and any variance on those shapes in three dimensions, and other known parameters. In an embodiment, the output includes a component level design model of the entire core structure, with relevant features of the identified core material either illustrated at pertinent locations in the design model or separately specified in a manner that can be converted into 3-D print instructions compatible with the 3-D printer to be used in the rendering phase.

Any structure may have load cases in all three directions (x, y, z) based on the function the structure is performing. (One exception may be when the structure is being tensile tested in a single direction). In an aspect, a load in two or more directions, e.g., three directions (x, y, z) may be analyzed. The analysis of loads in all three directions may be used to design an optimized core for the structure. The design of the structure may be based on expected loads in all three directions. As used herein, "optimize" a core may mean designing the core based on the expected loads of the core, e.g., in all three directions. The loads may be average values, maximum values, or varying values over time. As noted above, the loads designed for may be a percentage of the expected loads, such as 200% of the expected loads. By utilizing AM technology, the core may be optimized to give varying support and stiffness as determined by the anticipated, simulated, or actual measured global loads in all three axes and can transition seamlessly between the various methods of support. For purposes of this disclosure, an algorithm that computes loads in three dimensions in any reference or coordinate system is deemed to compute the loads across all three axes (x, y, z) in the Cartesian coordinate system, since the angular, cylindrical and spherical coordinate systems, and any other coordinate system, can all be converted into Cartesian coordinates.

Printing the core may provide for a 3-D printed part that may be generated all at once rather than formed by gluing together different parts of a core in different directions to provide strength in different directions, as noted above. The systems and methods described herein may provide for cores to be generated during a single printing or by fewer printings as compared to using different cores, core layers, or core segments to provide strength to an area for a particular axis. In an example, the core and the face sheet of the composite part may be co-printed.

Additionally, in an embodiment, the system 300 in FIGS. 3A-D may use AM to integrate a core with other functional interfaces of a part to seamlessly transition from the core into the functional interface of the part. Printing some combination of the core, the interface, and/or the face sheet(s) may reduce discontinuities or sharp gradients in the loads, which may otherwise be undesirable when implemented. For example, the core may be used in an exterior panel assembled into a boat or aircraft. In that situation, a variety of fluid-based forces may be continually changing in direction and time. These fluids contribute stresses to the panel that can be significantly exacerbated at the discontinuity regions, which are not optimized to support them. Problems of this kind are often inherent in traditional manufacturing techniques, which may assemble cores and then use abrupt transitions to another material to provide an interface. In an aspect, a core may be printed such that density of material may be increased across the core until a solid interface is formed, e.g., at an end of the core using additive manufacturing. 3-D printing may allow for a gradual transition from, e.g., a low-density core, to an intermediate density core, and ultimately to a complete fill density core (solid interface part). Outer skins may be added directly as part of 3-D printing, or they may be assembled using RTM or another conventional process, whereafter they may be added to the core.

In an exemplary embodiment, AM may be used rather than the piecewise manufacturing processes typifying conventional approaches. While piecewise manufacturing may use adhesion, AM may use all adhesion with face sheets bonded to a structural core piece. With AM, a core is not bonded to an interface; rather, the core is part of the interface. With 3-D printing, carbon fiber may be laminated onto a metal part rather than using a glue layer to secondarily bond metal to the core. The cores can also be bonded to cured composite face sheets.

In an aspect, where a single material will suffice, optimization of a core may be incorporated into a homogeneous structure including external face sheets. Aspects may also include a transition to non-cored functional and/or structural elements. Aspects that include a transition to non-cored functional and/or structural elements may be used in a variety of panel applications in transport structures and other mechanized assemblies.

Figure 13:
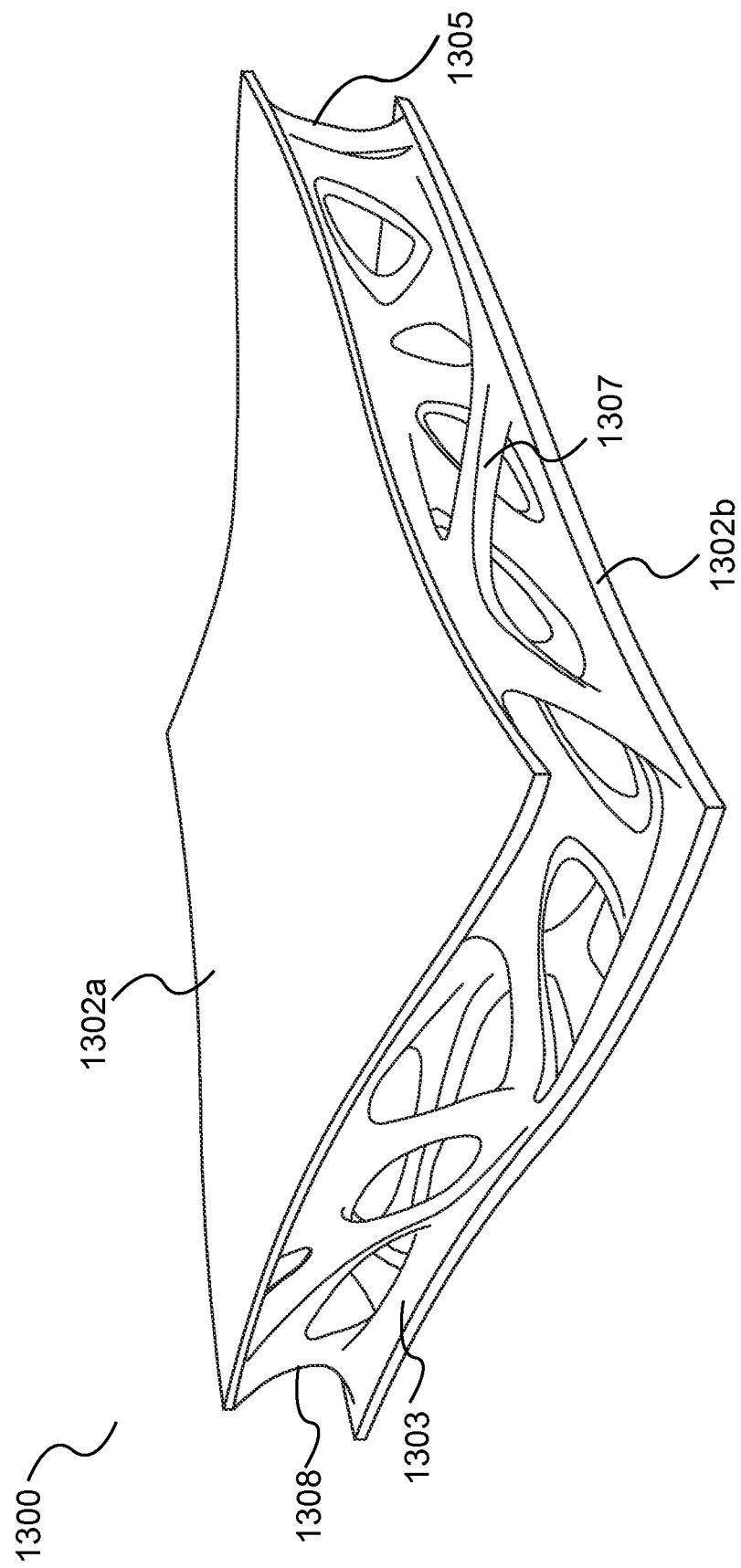
FIG. 13 is a perspective view of a an exemplary panel having a curved custom core and curved face sheets.

FIG. 13 is a perspective view of an exemplary panel 1300 having a curved custom core 1308 and curved face sheets 1302a-b. The AM core 1308 may be additively manufactured based on an intended structural application of the panel/panel section. Face sheets/skins 1302a-b may, as before, be 3-D printed, traditionally formed and/or formed using the curved AM core 1308 as a tool. Unlike the planar face sheets of previous examples, face sheets 1302a and 1302b are contoured in a manner to meet the requirements of the application. As before, the entire panel section may be co-printed and later joined, or co-printed as an assembled unit (e.g., in MAP applications or where the core/skin material is identical, and it certain other applications.

The AM core 1308 of FIG. 13 is a good illustration of the ability to use AM to shape the structure of the core in any manner needed for an intended application, such as to optimally provide load bearing structures without unnecessary mass, and to provide different structures at different locations of the panel section. For example, certain core elements, such as member 1305 generally run orthogonal to its respective meeting points at the face sheets 2012a and 1302b. By contrast, core member 1303 may run substantially along the path of the face sheets, and at a right angle to member 1305. In addition, core 1308 may provide any type of member or elemental structure between these two extremes, such as core element 1307 which runs diagonally relative to face sheets 1302a-b. As is evident from FIG. 13, the core 1308 may include a number of empty regions where no mass is needed. In an embodiment, the applicable physics models and main inputs (e.g., forces, torques, etc.) may be input into an optimization algorithm to produce the ideal set of structures in view of the panel's application and intended environment.

Figure 14:
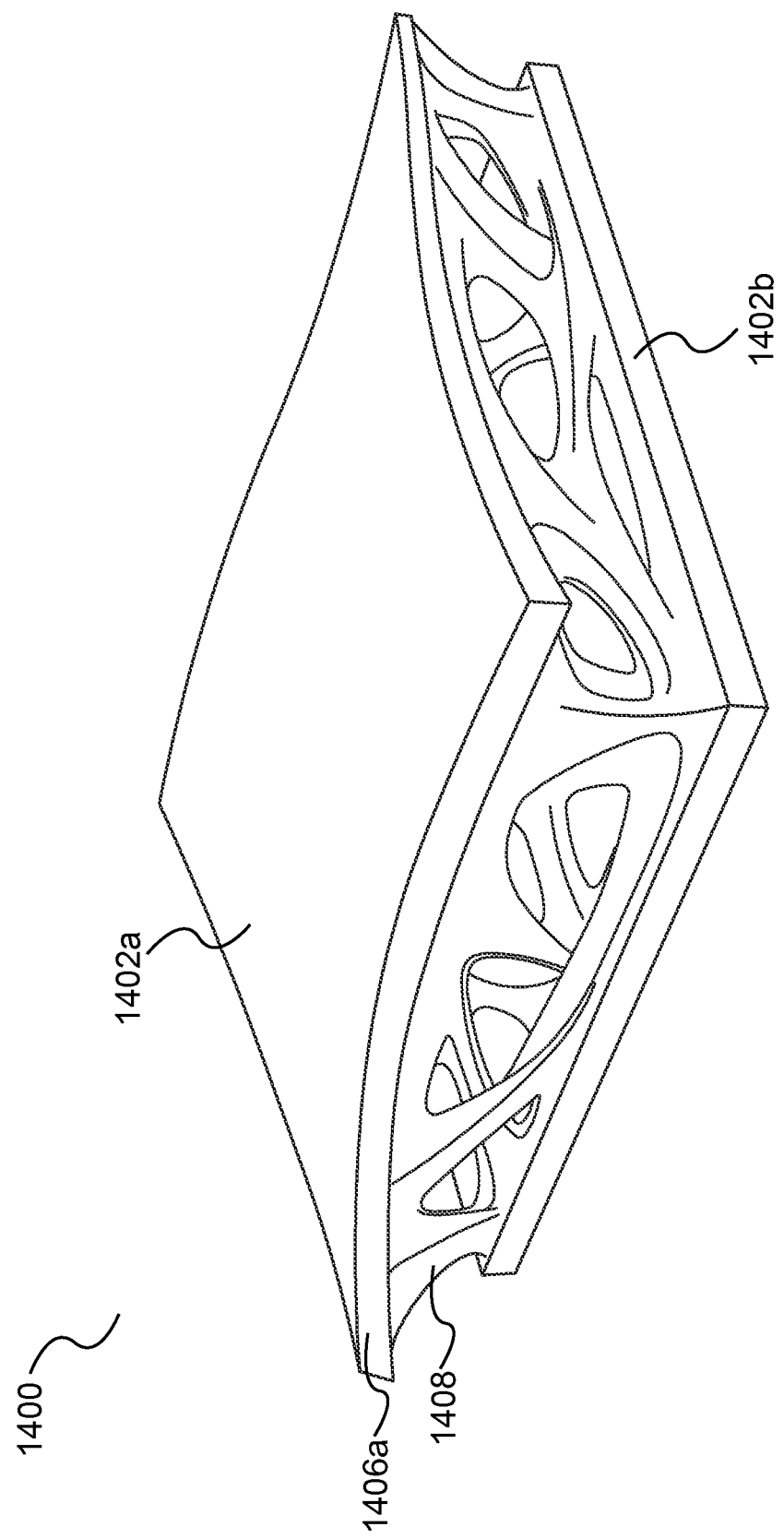
FIG. 14 is a perspective view of an exemplary panel having a curved upper face sheet having a variable thickness, a custom core contoured to the upper face sheet, and a generally planar lower face sheet.

FIG. 14 is a perspective view of an exemplary panel 1400 having a curved upper face sheet 1402a having a variable thickness, a custom core contoured to the upper face sheet 1402a, and a generally planar lower face sheet 1402b. In this panel section 1400, face sheet 1402b is printed or formed as generally planar (or rectangular), whereas the upper face sheet 1402a is curved in specific geometrical directions. In addition, while the thickness of the lower skin 1402b in this embodiment is generally uniform, the thickness of upper skin 1402a varies across the panel section. Thus, while it is apparent that the cross-sectional thickness of wall 1406a of upper skin 1402a is more or less uniform, it is also evident that the cross-sectional wall 1406b of upper skin 1402a becomes progressively thinner along that side of the panel. In this embodiment, the panel may be optimized using an algorithm that considers the load on the entire panel, and that provides recommended dimensions of the face sheets 1402a and 1402b in addition to the structural optimization of the core 1408. In other embodiments, a designer may select a curved shape and variable thickness, at least in part, based on an aesthetic value of design of the face sheets, and these chosen dimensions of the face sheets 1402a-b may become inputs in the algorithm that optimizes the structural makeup of AM core 1408. In other embodiments, the makeup of the core (e.g., its variable thickness) may be optimized by the algorithm based on a selected curvature of the face-sheet of the designer.

Figure 15:
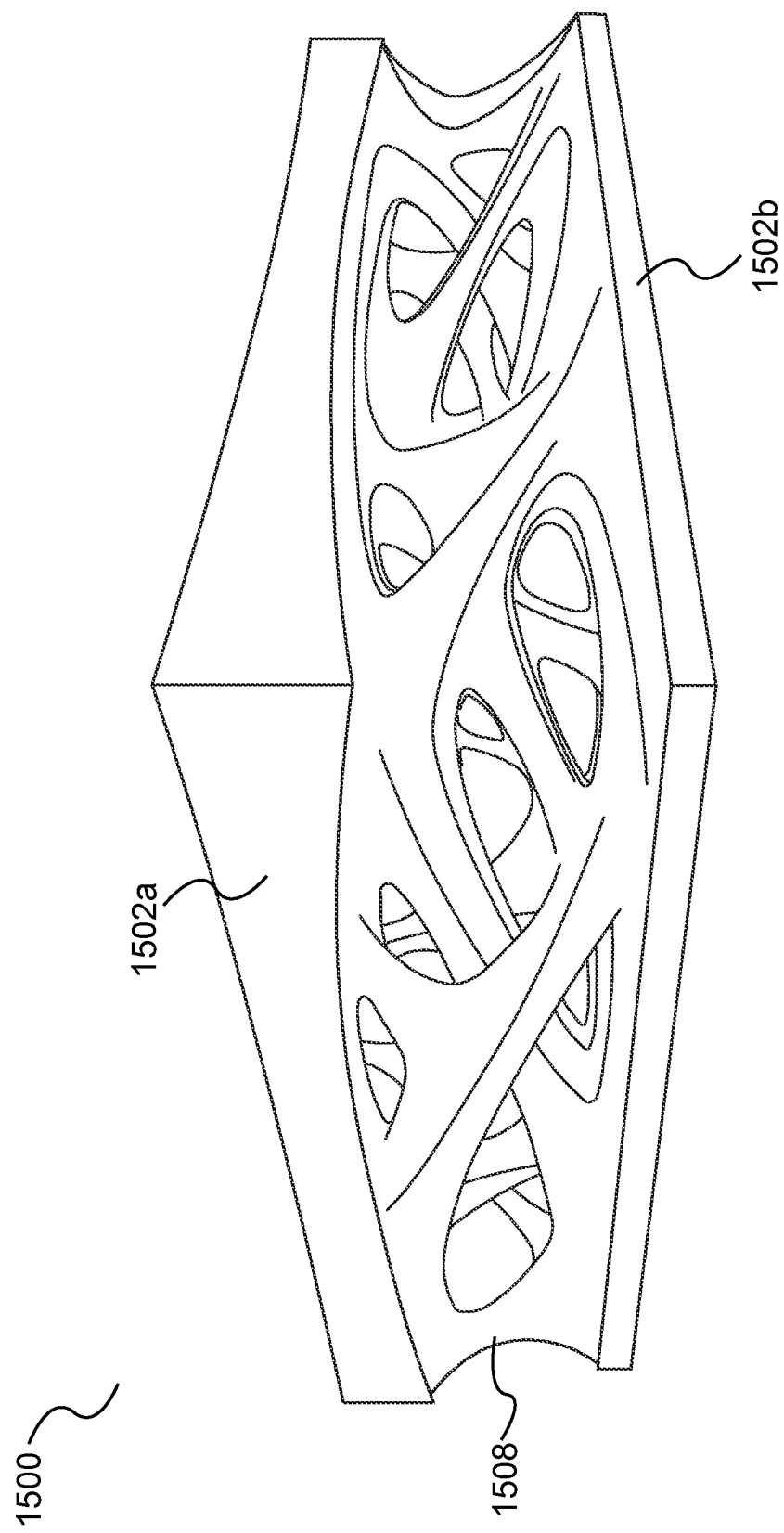
FIG. 15 is a perspective view of another exemplary panel having a curved upper face sheet with a variable thickness, a generally planar lower face sheet, and a custom core that matches the contour of the face sheets.

FIG. 15 is a perspective view of another exemplary panel section 1500 having a curved upper face sheet 1502a with a variable thickness, a generally planar lower face sheet 1502b, and a custom core 1508 that matches the contour of the face sheets. The embodiment of FIG. 15 bears similarities to that of FIG. 14. One difference is that the thickness of upper skin 1502a appears to be substantially greater than the corresponding thickness in lower skin 1502b. The AM core 1508 otherwise appears to have similar organic features that may be developed based on one or more physics models.

Figure 16:
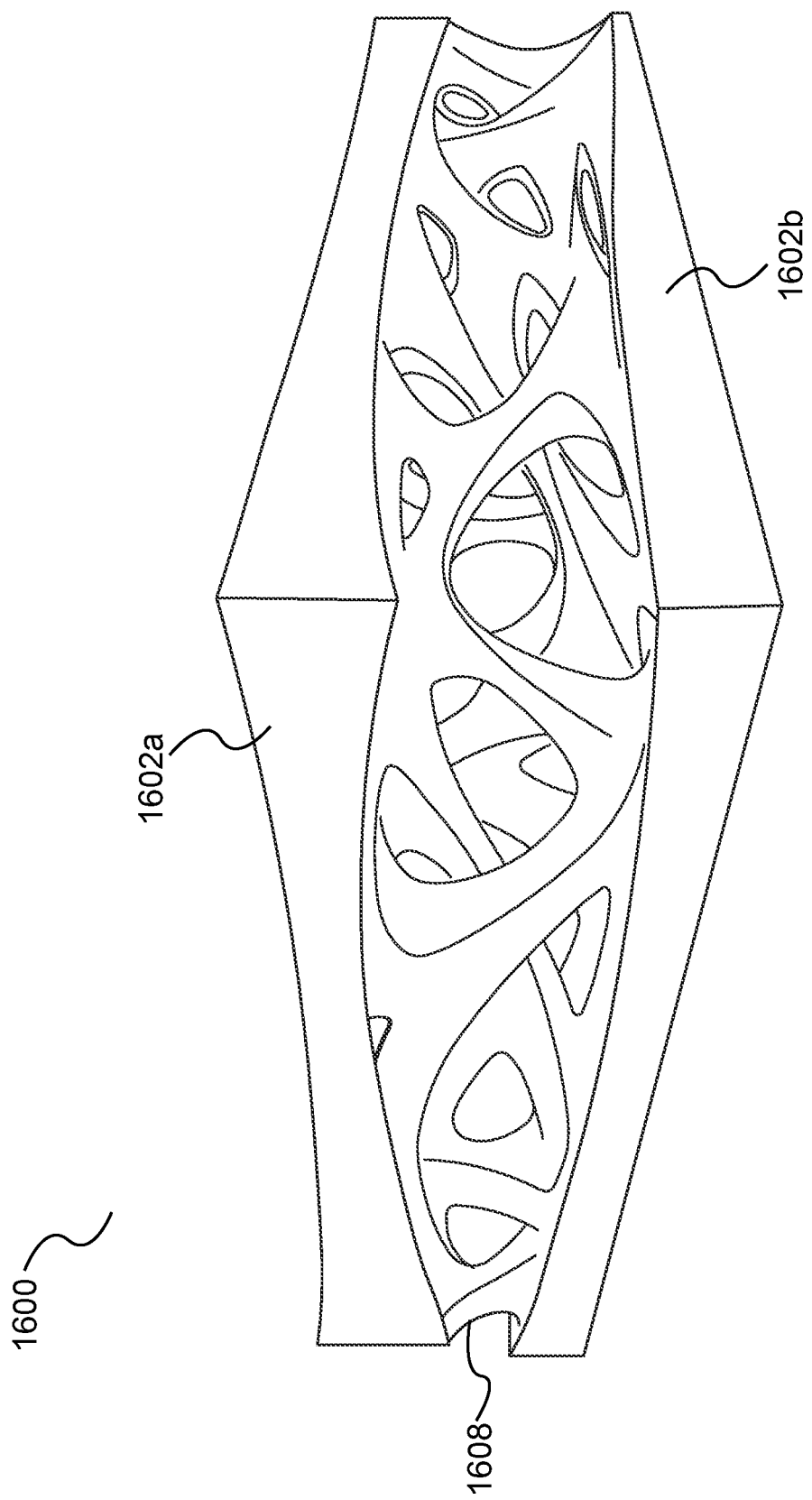
FIG. 16 is a perspective view of another exemplary panel having curved upper and lower face sheets of variable thicknesses, and a custom core shaped to match the contour of the face sheets.

FIG. 16 is a perspective view of another exemplary panel section 1600 having curved upper and lower face sheets 1602a-b of variable thicknesses, and a custom core 1608 shaped to match the contour of the face sheets. In the panel section 1600 of FIG. 16, the face sheets 1602a-b appear to be very thick and at least skin 1602a has a more substantial curvature than the corresponding skin of FIG. 15. The lower skin 1602b also appears to have a similar thickness in most regions except on the far right.

Each of the above embodiments demonstrates that the panels as described herein may have both unique optimized AM cores as well as unique face sheets, all of which can be generated, customized and optimized from the ground up to ensure a panel that functions as intended when incorporated in a vehicle, transport structure or other mechanized assembly.

In another aspect of the disclosure, custom AM panels include panel interfaces that provide the ability to incorporate ports, protrusions, receiving slots, integrated fasteners, threading solutions, fastener receiving solutions, orientation fixturing features, inserts, or other features for connecting to fasteners of other structure, or for other purposes. Conventionally, incorporation of these structures is a laborious process involving a significant amount of machining. In embodiments involving additively manufactured cores for sandwich panels and inserts, these features may instead be additively manufactured with the core. In one exemplary embodiment, the bulk of the additively manufactured core may be a plastic material, while the inserts constituting the features for connecting to fasteners may be printed or co-printed using a metal or metal alloy. In a MAP application, the structures may be assembled and adhered together using different AM techniques or a combination of AM and SM. The panel interface features discussed herein may be separate components that can be 3-D printed, co-printed with the panel (core and/or face sheets), or traditionally formed. The panel interface features can thereafter be bonded to the core. In other embodiments, the panel interface features are part of the custom core and can be printed during AM of the core.

An example of a fixturing feature is shown in FIG. 17. Specifically, FIG. 17 is a perspective view of an exemplary AM honeycomb panel 1700 having a cutout in the panel face sheet 1702 for incorporating features for fixturing. FIG. 17 is not necessarily drawn to scale, but rather to emphasize various important features. Additively manufactured core 1706 is arranged between face sheets 1702 and 1704 as described above. Face sheet 1702 includes a cutout 1710, which may be a circular (or other) region in face sheet 1702 from which print material was not deposited or fused in an AM process. In the case where face sheet 1702 is formed using conventional techniques, cutout 1710 may actually be cut from the face sheet, or a hole may be punched to produce the cutout using a suitable tool. AM core 1706 may be 3-D printed to include a protruding portion 1707 that extends upward. On a surface of the protruding portion 1707, a feature 1708 for fixturing may be provided. The fixturing feature 1708 may be adhered to the protruding portion 1707 using an adhesive or otherwise secured to protruding portion 1707 using fasteners, screws, bolts, or similar hardware. In an exemplary embodiment, the core structure may be heated and fused to the fixturing feature 1708 to realize the connection. In still another embodiment where MAP is used or where the core structure 1706, face sheets 1702, 1704 and fixtures 1708 are a single material, panel section 1700 may be 3-D printed as a single unitary structure.

The feature 1708 may be co-printed with AM core 1706, with face sheets 1702 and 1704, or with the entire assembly. The panel 1700 may thus be securely fixture to a node (not shown) or may provide other functionality. The circular regions 1712 on feature 1707 may be receptacles for receiving tubes, extrusions, etc. In an embodiment, fixturing feature 1708 may be used to secure the panel 1700 to an interior portion of a vehicle. Feature 1708 may engage with an external structure affixed to or otherwise associated with the vehicle. A secure connection between fixturing feature 1708 and the external structure may be used to help secure and stabilize the panel with respect to the transport structure. The fixturing feature 1708 may be used for other purposes altogether as well.

Figure 18:
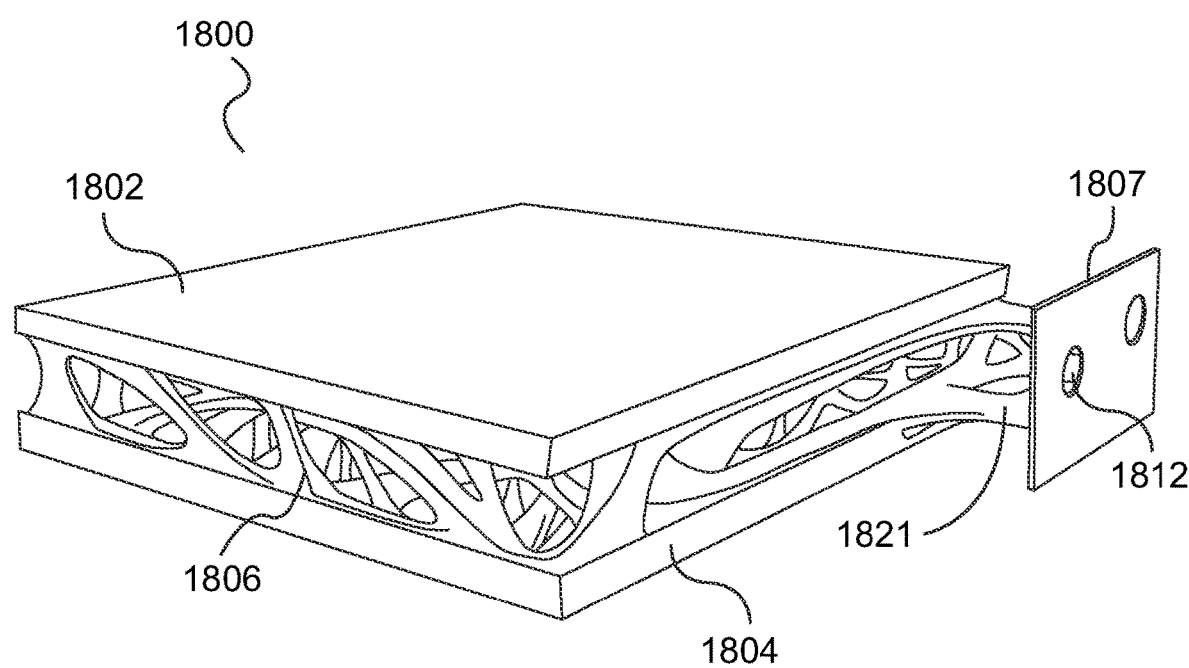
FIG. 18 is a perspective view of an exemplary AM panel having features for fixturing at a panel edge.

Another example of a fixturing feature is shown in FIG. 18. FIG. 18 is a perspective view of an exemplary AM panel section 1800 having features for fixturing at a panel edge. Here again, FIG. 18 is not necessarily drawn to scale. The embodiment of FIG. 18 is similar to that of FIG. 17 in that the panel includes an AM core arranged between two face sheets 1802 and 1804, as well as a protrusion portion 1821 to which a feature for fixturing 1807 is adhered or otherwise connected. The feature 1807 further includes circular regions 1812 (e.g., for providing a receptacle for a fastener or connector). One difference between FIGS. 17 and 18 is that in FIG. 18, the feature 1807 for fixturing is disposed on the edge of the panel 1800 rather than on the top through a face sheet, as in FIG. 17. This configuration obviates the need for a cutout region 1707 as seen in FIG. 17. The AM core 1806, like in FIG. 17, can be 3-D printed alone or co-printed with one or more other features, such as face sheets 1802, 1804 and feature 1807 in accordance with all of the manufacturing possibilities described in this disclosure. The choice of which configuration to use may depend on the magnitude and direction of the relevant forces expected to act on the panel 1800 when the panel 1800 is incorporated into a transport structure for prospective daily use. The fixturing feature 1807 may include the circular receptacles 1812 for providing an interface to another structure (e.g., a tube, node, another panel, etc.) using a fastener or other element.

Modifications to the arrangements in FIGS. 17 and 18 may be contemplated. For example, while one core protrusion corresponding to one feature for fixturing is shown in each embodiment, another AM panel may have a plurality of such protrusions and features. In still another embodiment, the AM core may include portions through both a cutout of the face sheet as in FIG. 17 and stemming from the panel edge as in FIG. 18, in which case multiple features for fixturing may be used with different orientations in a single panel. In other embodiments, the AM core protrusions and associated features need not be limited to vertical or horizontal orientations, but rather may be inclined in any direction. Such embodiments may be useful, for example, to connect different panel sections together at a fixed angle. In an exemplary embodiment, the design of such a panel may be optimized by a CAD or CAE optimization program after analyzing the various forces expected to be asserted on or by the different panels, e.g., through its use as assembled in a vehicle or other transport structure.

Figure 19:
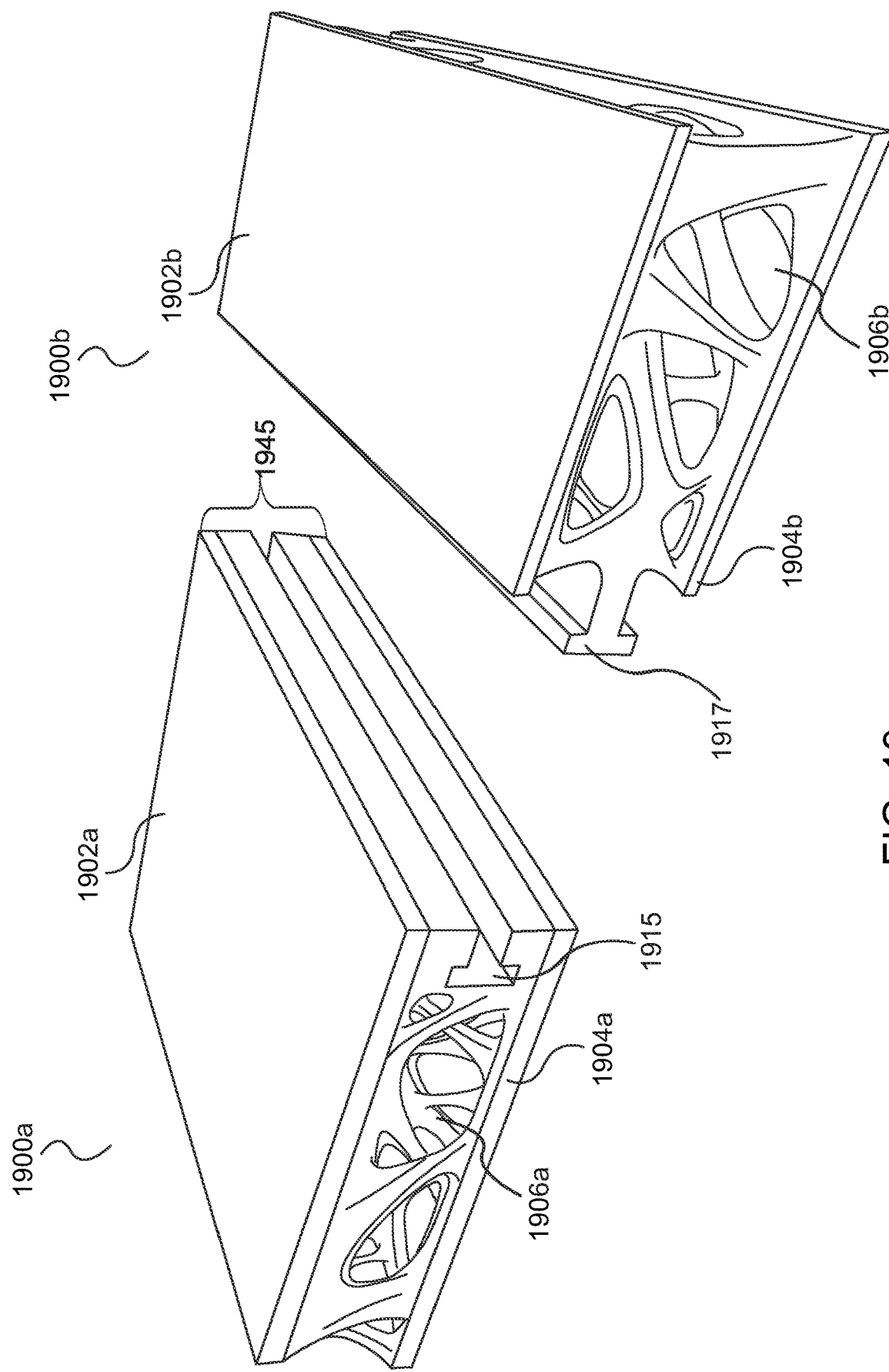
FIG. 19 is a perspective view of two exemplary panel sections having custom cores and configured to attach to one another via a slide-in feature using a receiving section at an interface of one panel and a protruding section at an interface of the other panel.

FIG. 19 is a perspective view of two exemplary panel sections 1900a and 1900b having custom cores 1906a and 1906b, respectively, generally planar upper and lower face sheets (1902a, 1904a for panel section 1900a, and 1902b, 1904b for panel section 1900b) and configured to fixably attach to one another via a slide-in feature 1915 using a receiving section 1945 at an interface of one panel 1900a and a protruding section 1917 at an interface of the other panel 1900b. In some embodiments, holes for adhesive may be provided to secure the bond between the panel sections after they are slidably connected.

Figure 20:
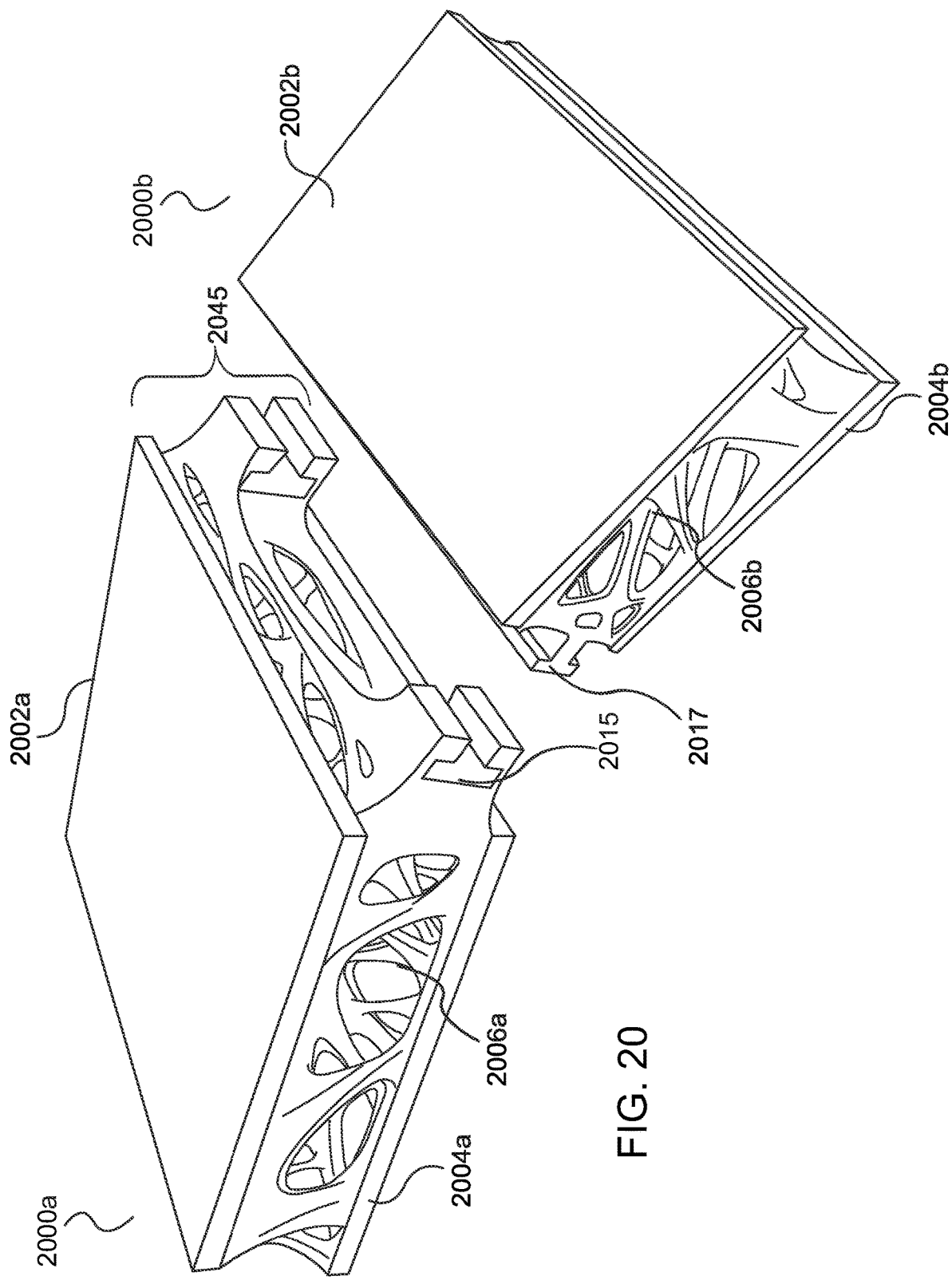
FIG. 20 is a perspective view of two exemplary panel sections having custom cores and configured to attach to one another via a slide-in feature using another receiving section at one panel interface and a protruding section at an interface of the other panel.

FIG. 20 is a perspective view of two exemplary panel sections 2000a and 2000b having custom cores 2006a and 2006b, respectively, generally planar upper and lower face sheets (2002a, 2004a for panel section 2000a, and 2002b, 2004b for panel section 2000b) and configured to attach to one another via a slide-in feature 2015 using another receiving section 2045 at an interface of one panel 2000a and a protruding section 2017 at an interface of the other panel 2000b. Here, the receiving section 2045 and associated slide-in feature 2015 may be 3-D printed as part of core 2006a, although in other embodiments receiving section 2045 may be co-printed, or traditionally formed and bonded to core 2006a. Receiving section 2045 is designed to affix to panel section 2000b by sliding the protruding section 2017 through the two receiving section portions 2015. Similar to FIG. 19, apertures may be included as adhesive or vacuum channels to fixably attach the two panel sections 2000a and 2000b in a desired aligned position relative to one another.

Figure 21:
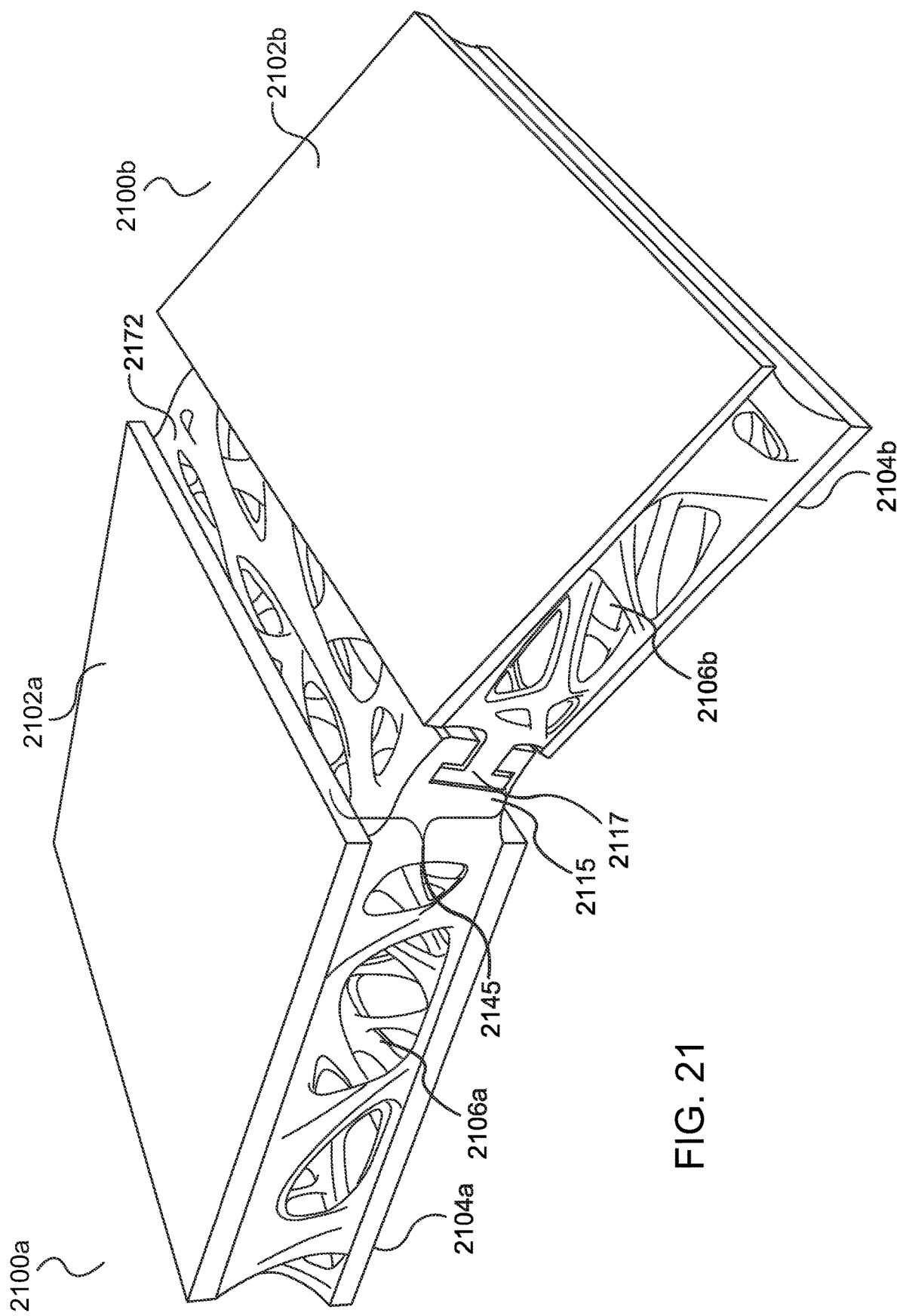
FIG. 21 is a perspective view of two panels sections attached at a panel interface using a slide-in feature including a protruding and a receiving section.

FIG. 21 is a perspective view of two panels sections 2100a and 2100b attached at a panel interface 2145 using a slide-in feature including a protruding and a receiving section. The protruding section 2117 may be part of core 2106a or may be co-printed of formed and subsequently bonded to core 2106a. Panel 2100a includes upper and lower face sheets 2102a and 2104a, respectively, and custom AM core 2106a. Panel 2100b includes upper and lower face sheets 2102b and 2104b, respectively, and custom AM core 2106b. Due to the design of the protruding and receiving sections 2117 and 2115 at interface 2145, the panel 2100b may slide seamlessly into the receiving section 2115 and be aligned at a particular angle. Adhesive or other fasteners may thereafter be used to join the protruding and receiving sections 2117 and 2115 via one or more channels. In this manner, the panel sections 2100a and 2100b can be fixably attached and securely aligned at a predetermined angle relative to each other.

It should be noted that while the figures generally show the joining of panel sections using generally planar face sheets, this need not be the case and the face sheets and AM core may be contoured in any suitable manner, and thereafter joined.

While protrusions and slide-in features have been illustrated above to effect the secure fastening of panel sections relative to each other, it will be appreciated upon review of the present disclosure that a wide variety of fastener and fixturing types may be implemented to connect the panels.

Figure 22:
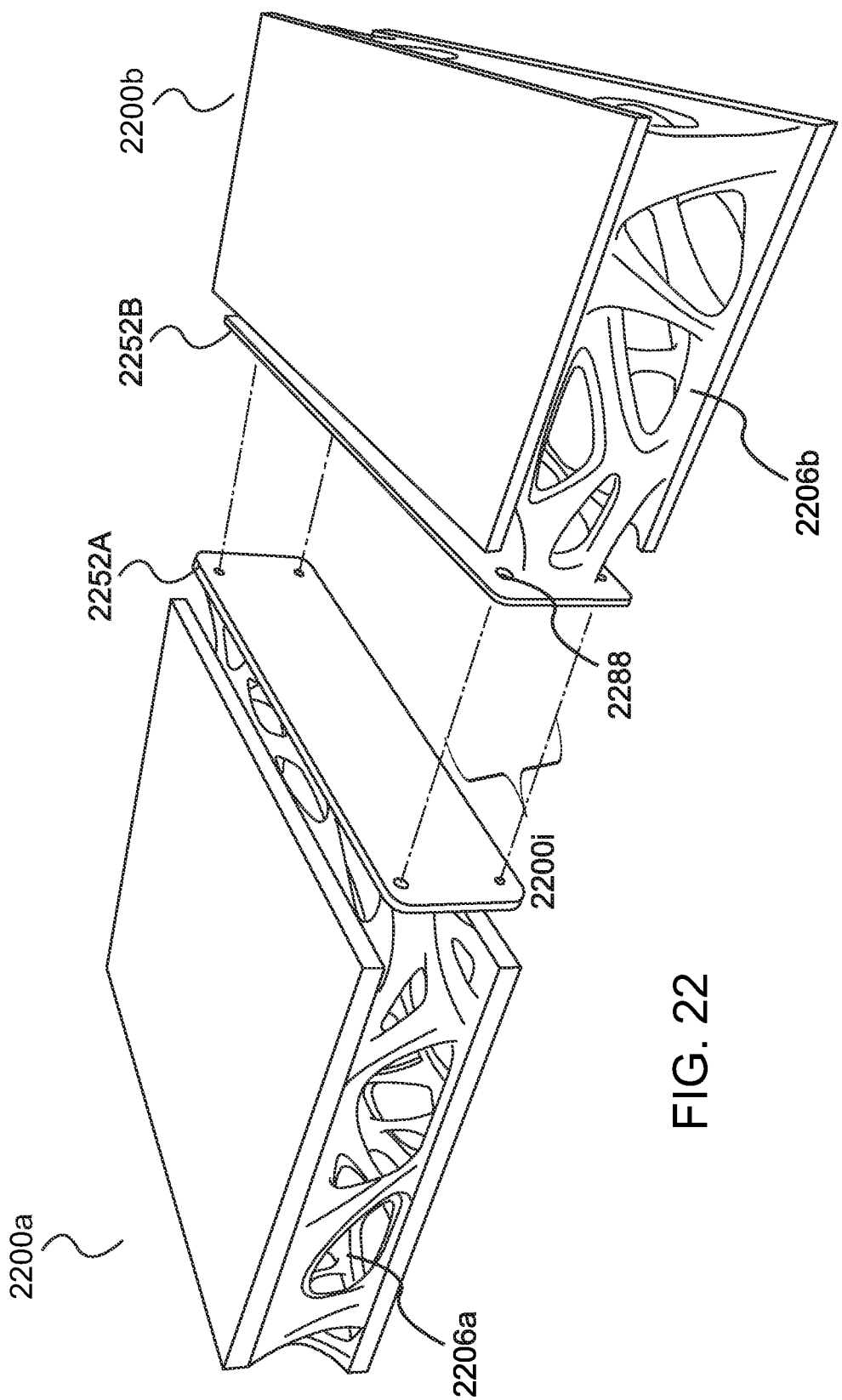
FIG. 22 is a perspective view of two panel sections having a core with plates and apertures for threading screws to affix the sections together.

FIG. 22 is a perspective view of two panel sections 2200a and 2200b, respectively, having AM cores 2206a and 2206b, respectively, with plates 2252A and 2252B at interface 2200i and apertures 2288 for threading screws or other fasteners to affix the sections together. Screws can be inserted along the opposing aligned apertures 2288. Alternatively or in addition, adhesive can be applied to the plates 2252A and 2252B. Using screws in this embodiment, the fastening features of panels 2200a and 2200b (i.e., plates 2252A and 2252B, respectively) can be joined directly to fixably attach the panels along the same axis. That is, panel sections 2200a and 2200b may be aligned in a planar fashion using the plates as fixturing features. The plates 2252A-B may be part of the respective AM cores 2206a-b. Alternatively, they may be co-printed with their AM cores 2206a-b or otherwise joined using glue. Apertures 2288 may in some embodiments accommodate bolts with threads in order to securely fasten the plates together to ensure proper alignment.

Figure 23:
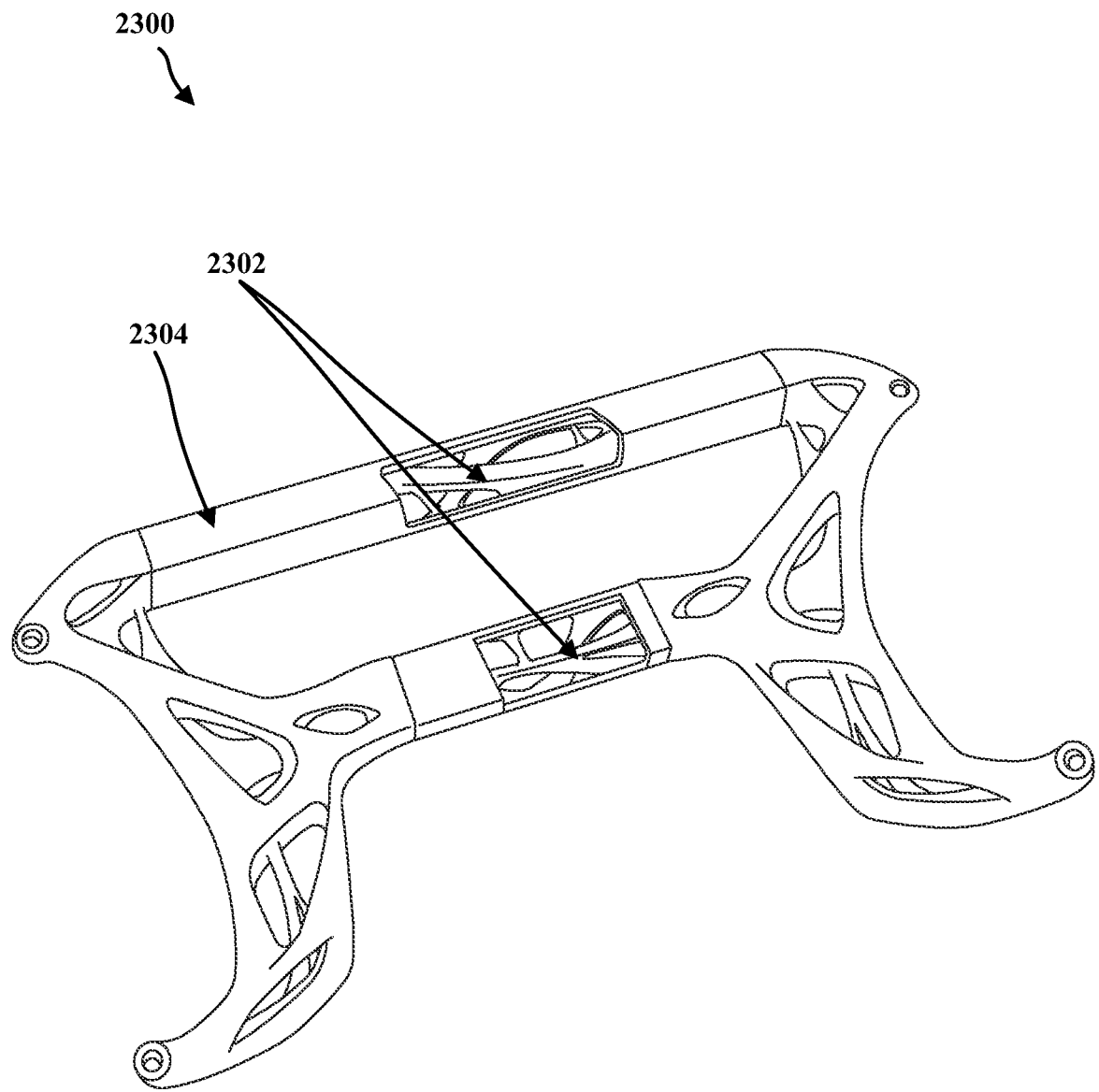
FIG. 23 is a diagram illustrating an example of an automotive subframe comprising tri-axially optimized composite structure.

FIG. 23 is a diagram illustrating an example tri-axially optimized composite structure 2300. The example tri-axially optimized composite structure 2300 may be an automotive subframe. Additionally, the example tri-axially optimized composite structure 2300 of FIG. 23 may include two example composite structures. Each of the two example composite structures may include a tri-axially optimized core 2302. The tri-axially optimized core 2302 may provide a homogenous transition from a structural hardpoint to an optimized core, which may dramatically reduce or eliminate the sharp gradients found in conventional panels. Additionally, each core may be covered by a carbon fiber composite skin 2304. Thus, the members in FIG. 23 may include panels that include optimized AM cores 2302 and face sheet(s) 2304.

In an aspect, the systems and methods described herein may be used for an automotive subframe. In such an example, hardpoints may be integral to and transition into the tri-axially optimized core 2302. In an aspect, the spans between the functional hardpoints may be part of the tri-axially optimized core 2302. Additionally, the tri-axially optimized core 2302 may transition to structural hardpoints.

In another embodiment, where a multi-material solution is used, the tri-axially optimized core 2302 may be adapted to interface to other skin materials such as carbon fiber sheets.

In another embodiment, where composite skins are used, the optimized 3D printed core (i.e., tri-axially optimized core 2302) may include vacuum and/or resin infusion ports or sealant ports. In an embodiment, the ports are included with the structure at the design stage and co-printed at the AM stage. These ports may be used for the co-molding process, for example, where the composite skin is directly formed over the core.

In another embodiment, integral co-printed fasteners may be integrated. For example, a universal fastener interface can be included that would allow the attachment of various attachment fasteners.

Figure 24:
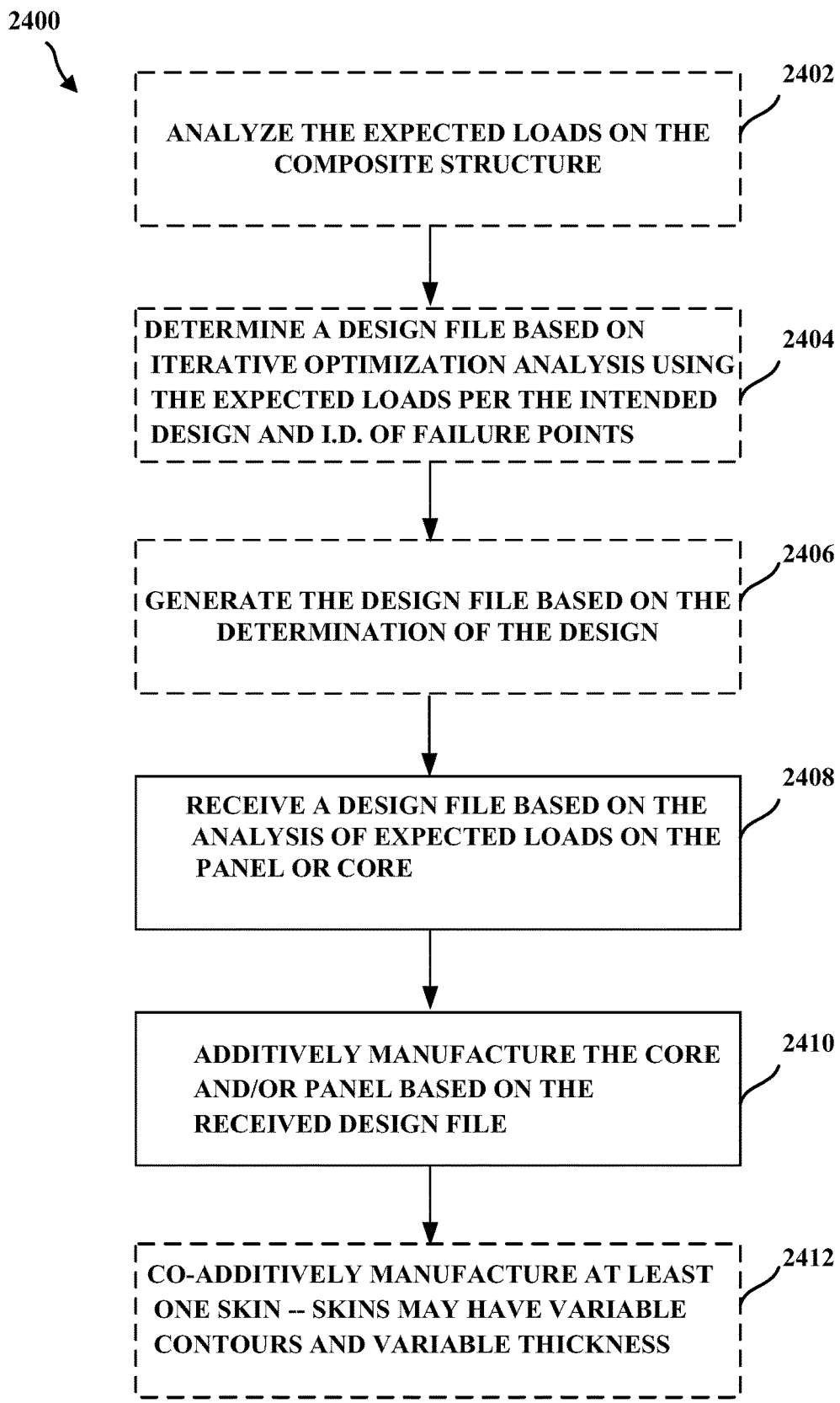
FIG. 24 is a flowchart illustrating an example method in accordance with the systems and methods described herein.

FIG. 24 is a flowchart 2400 illustrating an example method in accordance with the systems and methods described herein. Dashed blocks show optional embodiments. At a block 2402, a system implementing the method may analyze the expected loads on the composite structure. For example, a processing system within the system 300 may analyze the expected loads on the panel structure. Alternatively, a processing system separate from the system 300 may analyze the expected loads on the composite structure. This analysis may be part of the optimization algorithm described herein, or an initial step of the analysis.

At a block 2404, a system implementing the method may determine a design for the core material based on the analysis of the expected loads. For example, a processing system within the system 300 (FIGS. 3A-D) or on a separate workstation/server may determine a design for the core material based on specific inputs and the analysis of the expected loads. The expected loads may vary based on the intended design or application of the parts. Failure points may be determined based on the loads as described above. The failure points may be used as inputs in the next set of iterative-based optimizations.

At a block 2406, a system implementing the method may generate the design file based on the determination of the design. For example, a processing system within the system 300 may generate the design file based on the determination of the design. Alternatively, a processing system separate from the system 300 may generate the design file based on the determination of the design.

At a block 2408, a system implementing the method may receive a design file based on an analysis of expected loads on a composite structure including the core material. For example, a processing system within the system 300 may receive a design file based on an analysis of expected loads on a composite structure including the core material. For example, the design file based on an analysis of expected loads on a composite structure including the core material may be received from a processing system separate from the system 300. In another example, the design file, as discussed above, may be generated by a processor in the system 300. The design file may be stored in a memory and received from the memory, e.g., at block 2408.

At a block 2410, a system implementing the method may additively manufacture the additively manufactured core material based on the received design file. For example, a processing system within the system 300 may additively manufacture the additively manufactured core material based on the received design file. Control circuitry associated with the 3-D printer may receive the design file and convert it to a series of instructions that are compatible with the language of the 3-D printer. Alternatively, a separate processing system may run an application that converts the design model into the printer-specific instructions, which may then be passed to the 3-D printer via a network.

At a block 2412, a system implementing the method may co-additively manufacture at least one skin or face sheet, the additively manufactured core material and the at least one skin/face sheet including the composite structure. For example, a processing system within the system 300 may co-additively manufacture at least one skin, the additively manufactured core material and the at least one skin including the composite structure. As noted, skins may be planar or non-planar and may include variable contours, variable thicknesses, or both.

A composite structure may include an additively manufactured core material, the additively manufactured core material strengthened in at least a first direction and a second direction based on an analysis of expected loads of the resulting composite structure formed using the core and at least one structural skin co-molded to the core material to form the composite structure.

In an aspect, the additively manufactured core material is strengthened in a third direction.

In an aspect, the first direction, the second direction, and the third direction are perpendicular to each other.

In an aspect, the additively manufactured core material includes a homogeneous structure.

In an aspect, the composite structure includes a homogeneous structure.

In an aspect, the composite structure further includes a transition to a non-cored functional element or a non-cored structural element.

In an aspect, the composite structure includes a complete inner structure.

An aspect may include at least one of a heater blanket channel, a bonding interface for at least one of titanium, stainless steel, or other metal material, or at least one of integral vacuum or adhesive ports.

An aspect may further include at least one integrated hardpoint made of material that transitions into the core.

An aspect may further include at least one integrated hardpoint made of material that transitions into the core.

An aspect may further include at least one of a vacuum port, a resin infusion port, an exhaust port, a sealant port, or another type of port or channel.

An aspect may further include at least one co-printed fastener.

A 3D printed core may include an additively manufactured core material, the additively manufactured core material strengthened in at least a first direction and a second direction based on an analysis of expected loads of a composite structure formed using the core.

In an aspect, the additively manufactured core material is strengthened in a third direction.

In an aspect, the first direction, the second direction, and the third direction are perpendicular to each other.

In an aspect, the additively manufactured core material includes a homogeneous structure.

An aspect may further include at least one structural skin co-molded to the core material to form the composite structure.

In an aspect, the composite structure includes a homogeneous structure.

In an aspect, the composite structure further includes a transition to a non-cored functional element or a non-cored structural element.

In an aspect, the composite structure includes a complete inner structure.

An aspect may further include at least one of a heater blanket channel, a bonding interface for at least one of titanium, stainless steel, or other metal material, or at least one of integral vacuum or adhesive ports.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A panel for use in a transport structure, comprising;
at least one face sheet having a cutout region; and
an additively manufactured (AM) core affixed to the at least one face sheet and having a varying strength across at least a portion of the AM core for supporting expected load conditions determined across all three coordinate axes (x,y,z), the AM core having a protruding portion extending through the cutout region, and the protruding portion is coupled to a fixturing feature for engaging with an external structure.

2. The panel of claim 1, wherein the at least one face sheet comprises a non-planar contour.

3. The panel of claim 1, wherein the at least one face sheet comprises a variable thickness.

4. The panel of claim 1, wherein the AM core comprises a homogenous material.

5. The panel of claim 1, wherein the AM core has the varying strength along a plurality of directions.

6. The panel of claim 1, wherein the expected load conditions comprise forces asserted in three dimensions.

7. The panel of claim 1, wherein the expected load conditions comprise forces asserted from a plurality of directions.

8. The panel of claim 1, wherein the expected load conditions comprise forces asserted on either or both of the panel or the AM core.

9. The panel of claim 1, wherein the expected load conditions comprise forces asserted on a plurality of locations of the panel or the AM core.

10. The panel of claim 1, wherein the AM core has one or more variable properties across one or more portions of the AM core for supporting the expected load conditions, wherein the one or more variable properties include one or more of a varying stiffness, a varying rigidity, a varying flexibility, a varying ductility, a varying density, a varying energy absorption, or a varying crush.

11. The panel of claim 10, wherein one or more of the varying stiffness, the varying rigidity, the varying flexibility or the varying density vary in a plurality of directions in the AM core.

12. The panel of claim 1, wherein the expected load conditions are derived from an intended application of the panel.

13. The panel of claim 1, wherein the AM core comprises a modified honeycomb structure.

14. The panel of claim 1, wherein the at least one face sheet is 3-D printed and has a contoured shape to form a non-flat panel when joined with the AM core.

15. The panel of claim 1, wherein the at least one face sheet is formed and has a contoured shape to form a non-flat panel when joined with the AM core.

16. The panel of claim 1, wherein the at least one face sheet comprises first and second face sheets,
the AM core is affixed between the first and second face sheets, and
the first and second face sheets are one of 3-D printed or formed and have contoured shapes to form a non-flat panel when joined with the AM core.

17. The panel of claim 16, further comprising:
a first adhesive layer adhered to the first face sheet and a first side of the AM core; and
a second adhesive layer adhered to the second face sheet and a second side of the AM core.

18. The panel of claim 1, wherein the AM core is quasi-isotropic.

19. The panel of claim 1, wherein the AM core is one of anisotropic or orthotropic based on an intended panel application.

20. The panel of claim 1, wherein the at least one face sheet comprises a carbon fiber reinforced composite material.

21. The panel of claim 1, wherein the AM core comprises a metal, an alloy, or a plastic material.

22. The panel of claim 1, wherein the AM core is additively manufactured to include one or more inserts.

23. The panel of claim 1, wherein the AM core is additively manufactured to include, at or near a core boundary, a connecting feature for mating with a corresponding connecting feature or fastener coupled to another structure.

24. The panel of claim 1, further comprising a connection feature or fastener co-printed with the AM core.

25. The panel of claim 1, wherein the cutout region is disposed on an upper surface of the at least one face sheet and an upper surface of the fixturing feature is parallel with the upper surface of the at least one face sheet.

26. The panel of claim 1, wherein the fixturing feature comprises at least one receptacle region for engaging with the external structure.

27. The panel of claim 1, wherein the external structure comprises a part of the transport structure, and the fixturing feature is coupled to the external structure to secure the panel to the transport structure.

28. The panel of claim 1, wherein the fixturing feature is adhered to the protruding portion via an adhesive.

29. The panel of claim 1, wherein the AM core comprises a first custom interface feature for interlocking with an adjacent panel having a second custom interface feature, the first and second custom interface features each comprising one of a projection feature and a receiving feature to enable fixturing of the panels for attachment.

30. The panel of claim 1, wherein the AM core comprises a custom interface feature having at least one connector for connecting the panel to one or more adjacent panels.

31. The panel of claim 30, wherein the at least one connector comprises a protruding connector.

32. The panel of claim 30, wherein the at least one connector comprises a receiving connector for engaging with a protruding connector.

33. The panel of claim 32, wherein the protruding connector comprises a tab and the receiving connector comprises a slot.

34. The panel of claim 29, wherein the receiving feature comprises a slide-in feature.

35. The panel of claim 29, wherein at least one of the first and second custom interface features comprises a plate, the plate having apertures for receiving a fastener.

36. The panel of claim 1, wherein the AM core comprises a powder removal feature.

37. The panel of claim 1, wherein the AM core comprises at least one channel for enabling resin flow.

38. The panel of claim 37, wherein the AM core further comprises at least one vacuum channel.

39. The panel of claim 1, wherein the AM core and the at least one face sheet are co-printed.

40. The panel of claim 1, wherein the AM core and the at least one face sheet are 3-D printed as a single integrated structure, and
the AM core is affixed to the at least one face sheet during the 3-D printing.

41. The panel of claim 40, wherein the AM core and the at least one face sheet comprise an identical material.

* * * * *